(12) United States Patent
Kim et al.

(10) Patent No.: US 11,886,565 B2
(45) Date of Patent: Jan. 30, 2024

(54) SERVER THAT SUPPORTS SECURITY ACCESS OF TERMINAL DEVICE OF THE USER AND CONTROLLING METHOD THEREOF

(71) Applicant: NATIONAL AGRICULTURAL COOPERATIVE FEDERATION, Seoul (KR)

(72) Inventors: Docheol Kim, Seoul (KR); Byungmu Chun, Uiwang-si (KR); Dongheon Kim, Uiwang-si (KR); Dongkwan Yuk, Uiwang-si (KR); Se Young Kim, Seoul (KR); Wooho Chi, Seoul (KR)

(73) Assignee: National Agricultural Cooperative Federation, Seoul (KR)

( * ) Notice: Subject to any disclaimer, the term of this patent is extended or adjusted under 35 U.S.C. 154(b) by 2 days.

(21) Appl. No.: 17/885,641

(22) Filed: Aug. 11, 2022

(65) Prior Publication Data
US 2023/0281288 A1  Sep. 7, 2023

(30) Foreign Application Priority Data

Mar. 3, 2022   (KR) .................. 10-2022-0027708
Mar. 23, 2022  (KR) .................. 10-2022-0036302
Mar. 24, 2022  (KR) .................. 10-2022-0036580
Mar. 24, 2022  (KR) .................. 10-2022-0036620

(51) Int. Cl.
*G06F 9/455* (2018.01)
*G06F 21/33* (2013.01)

(52) U.S. Cl.
CPC .......... *G06F 21/33* (2013.01); *G06F 9/45558* (2013.01); *G06F 2009/45562* (2013.01);
(Continued)

(58) Field of Classification Search
None
See application file for complete search history.

(56) References Cited

U.S. PATENT DOCUMENTS 8,091,088 B2    1/2012  Kishan et al.
9,154,488 B2 * 10/2015  Innes .................. H04L 63/0884
(Continued)

FOREIGN PATENT DOCUMENTS

CN    112073235 A  * 12/2020 ......... G06F 9/45558
EP    1693748 A2     8/2006
(Continued)

OTHER PUBLICATIONS

Office Action dated Jun. 9, 2022, Korean Patent Office, Korean Patent Application No. 10-2022-0036620, 6 pgs (and English translation).

(Continued)

*Primary Examiner* — Joseph P Hirl
*Assistant Examiner* — Hassan Saadoun
(74) *Attorney, Agent, or Firm* — Frost Brown Todd LLP

(57) ABSTRACT

A method for controlling an operation of a virtual machine on a cloud by a server is provided. The method includes: (a) receiving, from a terminal device of a user having only a usage authority for a specific virtual machine resource among a plurality of virtual machine resources, a request for allocating or deallocating at least some of the plurality of virtual machine resources to the terminal device; and (b) based on a control condition of the user for the at least some of the plurality of virtual machine resources being recognized, supporting to perform allocation or deallocation of the virtual machine resource by generating a process corresponding to the at least some of the plurality of virtual (Continued)

machine resources and loading the process on a memory or deleting the process from the memory according to the request.

18 Claims, 14 Drawing Sheets

(52) U.S. Cl.
CPC .............. *G06F 2009/45587* (2013.01); *G06F 2221/2129* (2013.01)

(56) References Cited

U.S. PATENT DOCUMENTS

| | | | |
|---|---|---|---|
| 2013/0227673 | A1* | 8/2013 | Yoon .................. G06F 21/6209 726/15 |
| 2016/0099917 | A1* | 4/2016 | Glazemakers ...... H04L 63/0272 726/12 |
| 2016/0344595 | A1 | 11/2016 | Jain et al. |
| 2016/0373424 | A1* | 12/2016 | Hussain .................. H04L 63/08 |
| 2019/0278928 | A1* | 9/2019 | Rungta ................. G06F 9/5077 |
| 2019/0361750 | A1* | 11/2019 | Sequeira ............... H04L 9/3268 |
| 2021/0173708 | A1* | 6/2021 | Moon ....................... G06F 9/50 |

FOREIGN PATENT DOCUMENTS

| | | |
|---|---|---|
| KR | 10-2006-0093650 A | 8/2006 |
| KR | 10-2013-0101663 A | 9/2013 |
| KR | 10-2016-0005113 A | 1/2016 |
| KR | 10-2016-0043706 A | 4/2016 |
| KR | 10-2016-0073904 A | 6/2016 |
| KR | 10-2017-0072552 A | 6/2017 |
| KR | 10-2017-0128270 A | 11/2017 |
| KR | 10-2018-0132233 A | 12/2018 |
| KR | 10-2019-0059661 A | 5/2019 |
| WO | 2016/126313 A1 | 8/2016 |

OTHER PUBLICATIONS

Office Action dated Jun. 13, 2022, Korean Patent Office, Korean Patent Application No. 10-2022-0036302, 7 pgs (and English translation).

Office Action dated May 10, 2022, Korean Patent Office, Korean Patent Application No. 10-2022-0036580, 6 pgs (and English translation).

Notice of Allowance issued by the Korean Patent Office for Korean Patent Application 10-2022-0036620, dated Nov. 29, 2022, with English translation.

* cited by examiner

SERVER THAT SUPPORTS SECURITY ACCESS OF TERMINAL DEVICE OF THE USER AND CONTROLLING METHOD THEREOF

CROSS-REFERENCE TO RELATED APPLICATION(S)

This application claims priority from Korean Patent Application No. 10-2022-0036620, filed on Mar. 24, 2022, Korean Patent Application No. 10-2022-0027708, filed on Mar. 3, 2022, in the Korean Intellectual Property Office, and Korean Patent Application No. 10-2022-0036302, filed on Mar. 23, 2022, in the Korean Intellectual Property Office and Korean Patent Application No. 10-2022-0036580, filed on Mar. 24, 2022, in the Korean Intellectual Property Office, the entire disclosures of which are herein incorporated by reference for all purposes.

TECHNICAL FIELD

Apparatuses and methods consistent with the disclosure relate to a server supporting virtual machine resource allocation on a cloud and a control method thereof.

In addition, the disclosure relates to a server supporting a security connection to a virtual machine on a public cloud and a control method thereof.

In addition, the disclosure relates to a server and a method for supporting access of a terminal device of a user in a security environment thereof, and more particularly, to a server supporting the terminal device of the user to access a work server in a corporate network through a security container and a method for supporting access of a terminal device of the user in a security environment thereof.

BACKGROUND

Cloud computing is a computing method in which a central server called a cloud server processes and analyzes data and provides a corresponding result to a user via a network. The use of cloud computing has been rapidly increased in that the high-performance cloud server may be easily accessed and used without restriction of a location.

Organizations that require a high security environment, such as financial institutions and large enterprises, have been passive in using cloud services in the past due to the openness of the cloud. However, as the need for remote work has increased according to the recent transition to a non-face-to-face society due to a pandemic, etc., these organizations also need to adopt cloud services. As one method, several organizations are considering the introduction of cloud-based virtual machine systems for remote work.

In this case, a user of the institutions uses the virtual machine with virtual machine resource allocated to his/her terminal device, and a server administrator has the authority to allocate the virtual machine resource entirely. This causes the following problems.

First, in cloud service-based virtual machine services, billing is made according to the usage of virtual machine resources in many cases. Once virtual machine resources are allocated to a specific terminal device of a user and a virtual machine process is generated, a server recognizes that a virtual machine is being used, regardless of whether the user actually uses the virtual machine or not. This is because software and hardware resources corresponding to the allocated virtual machine resources are occupied. Virtual machine resource allocation or deallocation is performed in the virtual machine server, and even when a session connected to the server is terminated in the terminal device of a user, a state of the virtual machine server is not affected. Accordingly, as long as the virtual machine resource is not deallocated, a fee may be charged regardless of whether the user actually uses the resource. Also, if virtual machine resources are not allocated to the server, the user cannot use the virtual machine even when requesting a server session.

Second, the existing system has a problem in that virtual machine resources are statically allocated according to a predefined criterion even though the virtual machine resource consumption may vary according to a user's task. This makes it difficult to increase allocation in real time when a large amount of virtual machine resources are required, and conversely, a resource waste occurs when a small amount of virtual machine resources is required.

In this case, in the related art, the user has to make a request to a server administrator to determine whether to allocate a virtual machine to the terminal device of the user or to adjust the amount of allocated virtual machine resources.

Therefore, the inventor developed a technology in which a user may directly control whether to allocate virtual machine resources to his/her terminal device and dynamically allocate virtual machine resources according to a work situation.

In addition, as an IT environment based on cloud computing became common, financial institutions, corporations, or public institutions began to recognize the cloud computing environment as an essential environment for utilization and integration of information system resources. In addition, as individuals use various cloud services in the Internet and mobile environments, awareness of the cloud computing environment has increased. As the cloud computing environment replaces the traditional IT environment, cloud security has emerged as a big issue.

Since the cloud service is an on-demand outsourcing service that provides various IT resources such as servers, storage, and software to tenants, security issues may arise inevitably.

In addition, externally, independent service appears to be provided for each tenant of the cloud service, but internally, the physical resources are eventually shared, and thus, a strong security system should essentially supported to provide the cloud service commercially.

Organizations that require a high security environment, such as financial institutions and large enterprises, have been passive in using cloud services in the past due to the openness of the cloud. However, as the need for remote work has increased according to the recent transition to a non-face-to-face society due to a pandemic, etc., these organizations also need to adopt cloud services. As one method, several organizations are considering the introduction of cloud-based virtual machine systems for remote work.

However, whether to use the virtual machine on a private cloud or a public cloud is problematic. Private cloud has the advantage of meeting the security requirements of organizations, but it is a method that takes a lot of time and cost to build. Meanwhile, although it is difficult to configure a security environment required by individual companies, the public cloud is usually only charged according to resources in use and a period, so an operational burden thereof is low and thus the public cloud may be suitable for individuals and small business owners.

Therefore, the inventor developed a device for supporting the use of virtual machines that may meet a high level of security required by institutions even on a public cloud with low operating costs.

Meanwhile, in recent years, with the spread of infectious diseases and the development of communication technology, remote work (or telecommuting) regardless of work place has increased. However, when a user (i.e., a worker) performs work as remote work, he/she needs to access a work server of an corporate network remotely, and thus, high security is required.

In this case, the terminal device of the user used by the user for remote work may be used not only for work but also for personal use of the user. In order to access a work server with a personal terminal device, various security requirements should be met, and this is generally provided as a security solution such as mobile device management (MDM). However, these security solutions may limit the functions of terminal devices for personal use, such as the Internet and cameras, and have a risk of collecting personal information, which has acted as a hurdle to the spread of terminal devices for remote work.

Accordingly, a technical method that allows a single terminal device of the user used by workers to be freely used for personal purposes while meeting the security requirements required for company work is required.

SUMMARY

Embodiments of the disclosure overcome the above disadvantages and other disadvantages not described above. Also, the disclosure is not required to overcome the disadvantages described above, and an embodiment of the disclosure may not overcome any of the problems described above.

The disclosure provides a server that supports a terminal device of the user to access a security server or a related work server in a security environment, and a method for supporting access of the terminal device of the user in the security environment.

The disclosure provides a server that checks whether a security network environment is maintained while a terminal device of the user accesses a cloud service and controlling access to a cloud service of the terminal device of the user or providing a security warning alarm, and a control method thereof.

The disclosure provides a server that allocates virtual machine resources to a user according to a user's request for virtual machine resource allocation or supports the allocation, and a control method thereof.

The problems to be solved by the technical spirit of the disclosure are not limited to the problems mentioned above, and other problems not mentioned will be clearly understood by those skilled in the art from the following description.

According to an embodiment of the disclosure, a method for controlling an operation on a cloud by a server comprising: (a) receiving, from a terminal device of a user having only a usage authority for a specific virtual machine resource among a plurality of virtual machine resources, a request for allocating or deallocating at least some of the plurality of virtual machine resources to the terminal device; and (b) based on a control condition of the user for the at least some of the plurality of virtual machine resources being recognized, supporting to perform allocation or deallocation of the virtual machine resource by generating a process corresponding to the at least some of the plurality of virtual machine resources and loading the process on a memory or deleting the process from the memory according to the request.

The step (b) may comprise based on a size of at least some of the plurality of virtual machine resources being within a range of a size of a virtual machine resource allowed to an organization, to which the user belongs, and based on a request for allocating the at least some virtual machine resources to the terminal device being received, supporting to allocate the at least some virtual machine resources to the terminal device and, accordingly to reduce virtual machine resources capable of being allocated to a terminal device of another user who belongs to the organization.

The method may further comprise: before the step (a): (a1) confirming or supporting to confirm whether the terminal device of the user requests a virtual machine resource through a first network meeting a predetermined security requirement; after the step (b), (c) after the allocation of the virtual machine to the terminal device of the user and the usage authority are confirmed and an authorization token is issued, in a state where the terminal device of the user communicates with the allocated virtual machine by using the authorization token, confirming or supporting to confirm a path of a packet transmitted or received between the terminal device of the user and the allocated virtual machine; and (d) based on determination that the transmission and reception packet is transmitted through a second network that does not meet the predetermined security requirement as a result of the confirmation of the path, blocking a session connection between the terminal device of the user and the virtual machine or controlling the terminal device of the user to issue a security warning on the terminal device of the user.

The method may further comprise: before the step (a): (x) based on, from the terminal device of the user—logically separated into (i) a security container for communicating with a server under a predetermined security condition required by the server and (ii) a non-security container for communicating with another server in a vulnerable situation than the security condition-, an access request for the server or a resource related thereto being received through the security container, confirming the security condition and unique identification information of the terminal device of the user; (y) determining whether the security condition is satisfied and the unique identification information corresponds to pre-registered information; and (z) based on determination that the security condition is not satisfied or the unique identification information does not correspond to the pre-registered information, denying or supporting to reject the access request of the terminal device of the user.

Additional and/or other aspects and advantages of the invention will be set forth in part in the description which follows and, in part, will be obvious from the description, or may be learned by practice of the invention.

BRIEF DESCRIPTION OF THE DRAWINGS

The above and/or other aspects of the disclosure will be more apparent by describing certain embodiments of the disclosure with reference to the accompanying drawings, in which.

DETAILED DESCRIPTION

Figure 1:
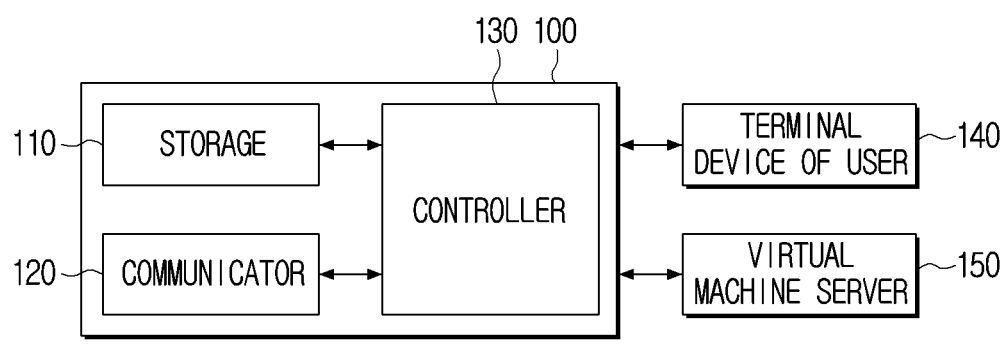
FIG. 1 is a block diagram illustrating a configuration of a server according to another embodiment of the disclosure.

Hereinafter, various embodiments of the disclosure are described with reference to the accompanying drawings. However, it should be appreciated that the disclosure is not limited to a specific embodiment and all modifications, equivalents and/or alternatives thereof also belong to the scope of the disclosure. The same reference numbers are used throughout the drawings to refer to the same or like parts.

In describing the disclosure, if a detailed description for a related known function or construction is considered to unnecessarily divert the gist of the disclosure, such explanation has been omitted but would be understood by those skilled in the art.

The disclosure may be embodied in many different forms and should not be construed as being limited to the embodiments set forth herein; rather, these embodiments are provided so that this disclosure will be thorough and complete, and will fully convey the concept of the disclosure to those of ordinary skill in the art.

Terms used in the present specification are used only in order to describe specific exemplary embodiments rather than limiting the disclosure. Singular forms are intended to include plural forms unless the context clearly indicates otherwise.

In the disclosure disclosed herein, the expressions "have", "may have", "include" and "comprise", or "may include" and "may comprise" used herein indicate existence of corresponding features (e.g., elements such as numeric values, functions, operations, or components) but do not exclude presence of additional features.

In the disclosure disclosed herein, the expressions "A or B", "at least one of A or/and B", or "one or more of A or/and B", and the like used herein may include any and all combinations of one or more of the associated listed items. For example, the term "A or B", "at least one of A and B", or "at least one of A or B" may refer to all of the case (1) where at least one A is included, the case (2) where at least one B is included, or the case (3) where both of at least one A and at least one B are included.

The terms, such as "first", "second", and the like used herein may refer to various elements of various embodiments of the disclosure, but do not limit the elements.

It will be understood that when an element (e.g., a first element) is referred to as being "(operatively or communicatively) coupled with/to" or "connected to" another element (e.g., a second element), it may be directly coupled with/to or connected to the other element or an intervening element (e.g., a third element) may be present. In contrast, when an element (e.g., a first element) is referred to as being "directly coupled with/to" or "directly connected to" another element (e.g., a second element), it should be understood that there are no intervening element (e.g., a third element).

When it is described that an element (e.g., first element) is "directly coupled" to another element (e.g., second element), no element (e.g., third element) may exist between the element and the other element.

According to the situation, the expression "configured to" used herein may be used as, for example, the expression "suitable for", "having the capacity to", "designed to", "adapted to", "made to", or "capable of". The term "configured to" must not mean only "specifically designed to" in hardware.

Instead, the expression "a device configured to" may mean that the device is "capable of" operating together with another device or other components. For example, an expression "processor configured to perform A, B, and C" may mean a dedicated processor (e.g., an embedded processor) for performing a corresponding operation or a generic-purpose processor (e.g., a central processing unit (CPU) or an application processor) which may perform corresponding operations by executing one or more software programs which are stored in a memory device.

In the description, the word "module" or "unit" refers to a software component, a hardware component, or a combination thereof, which is capable of carrying out at least one function or operation. A plurality of modules or units may be integrated into at least one module and implemented using at least one processor except for those modules or units that need to be implemented in specific hardware.

In an embodiment, a server supporting a specific operation may mean that the server transmits a control command or related information to an external device to perform an operation through the external device.

Meanwhile, various elements and regions in the drawings are schematically drawn. Therefore, the technical concept of the disclosure is not limited by a relative size or spacing drawn in the accompanying drawings.

Hereinafter, the disclosure will be described in more detail with reference to the drawings.

FIG. 1 is a block diagram illustrating a configuration of a server according to an embodiment of the disclosure.

A server 100 may include a storage 110, a communicator 120, and a controller 130.

The storage 110 may store at least one command related to the server 100. The storage 110 may store an operating system (O/S) for driving the server 100. In addition, the storage 110 may store various software programs or applications for the server 100 to operate according to various embodiments of the disclosure. In addition, the storage 110 may include a semiconductor memory such as a flash memory or a magnetic storage medium such as a hard disk.

Specifically, the storage 110 may store various software modules for operating the server 100 according to various embodiments of the disclosure, and the controller 130 may control the operation of the server 100 by executing various software modules stored in the storage 110. That is, the storage 110 may be accessed by the controller 130, and reading/writing/modification/deletion/updating of data may be performed on the storage 110 by the controller 130.

Meanwhile, in the disclosure, the term of storage 110 may refer to a memory (not shown), a ROM (not shown) in the controller 130, a RAM (not shown), or a memory card (not shown) mounted in the server 100 (e.g., a micro SD card, a memory stick).

The communicator 120 includes circuitry and is configured to communicate with an external device (e.g., the terminal device 140 of the user) and an external server based on a wired or wireless communication method. In addition, the communicator 120 may include an Ethernet module, a Wi-Fi module (not shown), and the like. Here, each communication module may be implemented in the form of at least one hardware chip. In addition to the aforementioned communication methods, the wireless communication module may include at least one communication chip performing communication according to various wireless communication standards such as Zigbee, universal serial bus (USB), mobile industry processor interface camera serial interface (MIPI), 3rd generation (3G), 3rd generation partnership project (3GPP), long term evolution (LTE), LTE advanced (LTE-A), 4th generation (4G), 5th generation (5G), etc. However, this is only an example, and the communicator 120 may use at least one communication module among various communication modules.

In addition, the controller 130 may control overall operations and functions of the server 100. Specifically, the controller 130 may be connected to the configuration of the server 100 including the storage 110, and may generally control the operation of the server 100 by executing at least one command stored in the storage 110 described above.

The controller 130 may be implemented in various manners. For example, the controller 130 may be implemented as at least one of an application specific integrated circuit (ASIC), an embedded processor, a microprocessor, a hardware control logic, a hardware finite state machine (FSM), and a digital signal processor (DSP). Meanwhile, in the disclosure, the term of controller 130 may be used to include a central processing unit (CPU), a graphic processing unit (GPU), a main processing unit (MPU), and the like.

Hereinafter, an operation of the controller 130 according to an embodiment of the disclosure will be described in detail with reference to the accompanying drawings.

Figure 2:
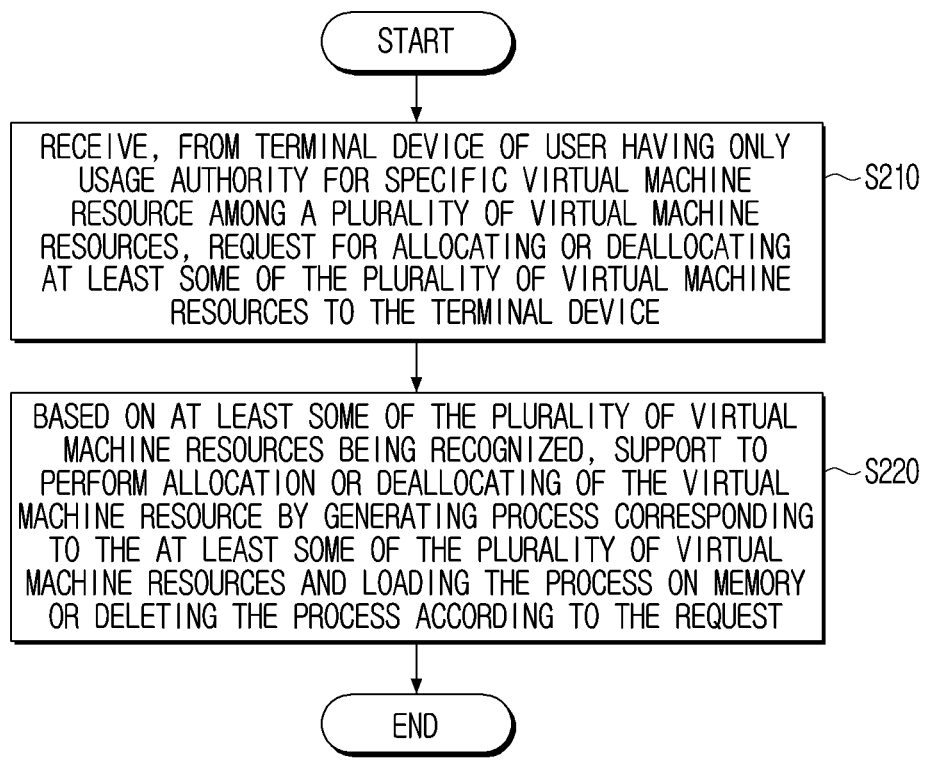
FIG. 2 is a flowchart illustrating a method of supporting virtual machine resource allocation according to another embodiment of the disclosure.

Referring to FIG. 2, the controller 130 may receive, from the terminal device 140 of the user having only a usage authority for a specific virtual machine resource among a plurality of virtual machine resources, a request for allocating at least some of the plurality of virtual machine resources to the terminal device or deallocating thereof (S210).

A virtual machine may emulate a fully operable computing system including at least one operating system and at least one application. That is, the virtual machine may refer to a computing environment implemented in software.

When virtualizing hardware in a virtual machine-based cloud computing environment, one or more virtual machines may be generated on the virtual machine server 150. Each virtual machine may run an independent operating system environment. An internal structure of a virtual machine is similar to a computing environment of a physical server, and like a real server, the virtual machine may utilize hardware resources such as CPU, memory, and storage, may run an operating system therein, and may run application programs.

Here, the virtual machine server 150 may include a plurality of virtual machine resources allocable to one or more external devices. That is, the cloud system may include the server 100 and the virtual machine server 150. In this case, the virtual machine server 150 drives a plurality of virtual machines. In addition, the server 100 or the virtual machine server 150 may allocate different virtual machine resources to one or more external devices, respectively. In this case, the server 100 or the virtual machine server 150 may allocate at least some of the plurality of virtual machine resources to the terminal device 140 of the user or deallocate virtual machine resources. In addition, the user may run an operating system and an application program using the virtual machine resource allocated to the terminal device 140 of the user.

In this case, the terminal device 140 of the user may have only a usage authority for a specific virtual machine resource among the plurality of virtual machine resources. That is, the terminal device 140 of the user is a terminal of the user who does not have a management authority for a plurality of virtual machine resources. The server 100 may allocate at least some of the plurality of virtual machine resources to the terminal device 140 of the user or support to deallocated the pre-allocated virtual machine resources.

Meanwhile, the virtual machine server 150 may generate a virtual machine, and the server 100 supports to allocate or deallocate a virtual machine resource, and the virtual machine server 150 may allocate or deallocate a corresponding virtual machine resource to the terminal device 140 of the user, but this is only an example, and the server 100 may generate a virtual machine and allocate or deallocate the virtual machine resource to the terminal device 140 of the user.

Meanwhile, in the disclosure, the terminal device 140 of the user may be a tablet PC, but this is only an example, and the terminal device 140 of the user may be implemented in various forms such as a smartphone, a mobile phone, a PC, a server, a smart TV, a personal digital assistant (PDA), a laptop, a media player, an e-book terminal, a digital broadcast terminal, a navigation device, a kiosk, an MP3 player, a digital camera, a wearable device, a home appliance, and other mobile or non-mobile computing devices.

In addition, when a control condition of the user for at least some of the plurality of virtual machine resources is recognized, the controller 130 may generate a process corresponding to at least some of the plurality of virtual machine resources according to a request and load the generated process to the memory or delete the generated process, thereby supporting to allocate or deallocate the virtual machine resource (S220).

Meanwhile, in the disclosure, the user may be a general user who does not have a management authority for a virtual machine on a cloud. That is, the user may be an individual virtual machine user having no management authority for the virtual machine on the cloud, different from a manager who manages the server 100 or the virtual machine server 150, so that a plurality of virtual machines may be generated to allocate virtual machine resources.

In this case, based on registered account information of the user, the controller 130 may allocate or support to allocate the virtual machine resource to the terminal device 140 of the user.

Specifically, the controller 130 may receive a request for allocating or deallocating at least some of the plurality of virtual machine resources corresponding to the registered account of the general user from the terminal device 140 of the user to the terminal device 140 of the user.

Specifically, the account information of the user may be registered in the storage 110 or a separate external server. In this case, the registered account information of the user may include information on a specific virtual machine resource to which the user has a usage authority.

In addition, the registered account information of the user may include information for confirming a control condition of the user. In this case, the controller 130 may check the control condition of the user for at least some of the plurality of virtual machine resources by using the registered account information of the user.

Furthermore, the controller 130 may support to allocate or deallocate at least some of the plurality of virtual machine resources to the terminal device 140 of the user.

For example, when the user has only a usage authority for the virtual machine resource A, when there is an allocation request for the virtual machine resource A and the virtual machine resource B from the terminal device of the user, and when the control condition of the user is recognized, the virtual machine resource A and the virtual machine resource B may be allocated to the terminal device of the user. Here, the control condition may include at least one of, in addition to the usage authority information, information on a task performed by a user, information on the task similar to a task of the user performed by a plurality of users in the past, information on a virtual machine resource given to an organization to which the user belongs, and virtual machine usage time information as described hereinafter.

Also, the controller 130 may generate a process corresponding to at least some of a plurality of virtual machine resources based on the environment data corresponding to the pre-registered account of the user and load the generated process to the virtual machine server 150 or a memory of the server 100, thereby supporting to allocate virtual machine resources.

Here, the environment data may refer to data on a usage environment in a virtual machine used by the user. For example, when different virtual machines are generated and virtual machine resources are allocated to terminal devices of users, respectively, each virtual machine may have data such as a mailbox and a document box configured to be different according to a usage environment of the user, and, accordingly, virtual machine resources may be allocated to be different. In this case, an account of the user may include data according to a virtual machine usage environment of each user, such as data in a mailbox and a document box. Accordingly, the controller 130 may support to allocate a virtual machine resource reflecting the environment data of the user to the terminal device 140 of the user by using the environment data corresponding to the pre-registered account of the user. Here, the environment data is not limited to the aforementioned examples and may be various types of data configuring the virtual machine environment of the user.

Meanwhile, for efficient and economical use of virtual machine resources, when a predetermined time has elapsed or a specific time arrives, the controller 130 may support to allocate or deallocate the virtual machine resources.

Specifically, based on a predetermined time elapsing or a predetermined certain time arriving after a predetermined virtual machine resource is allocated or deallocated on the terminal device 140 of the user, the controller 130 may support to delete a process corresponding to the allocated predetermined virtual machine resource or to generate a process corresponding to the deallocated predetermined virtual machine resource and load the process on the memory.

For example, when 9 hours have elapsed after the virtual machine resource is allocated, the controller 130 may delete or support to delete the process corresponding to the allocated virtual machine resource. Also, when 15 hours have elapsed after the virtual machine resource is deallocated, the controller 130 may generate a process corresponding to the virtual machine resource and load or support to load the process into the memory.

Also, the controller 130 may collectively deallocate a plurality of virtual machine resources that are not being used at a specific time, for example, 3 pm and 6 pm of the day, to reduce costs.

In this case, a predetermined time or a specific time may be set to be different for each user, and information thereof may be included in the account information of the user.

Also, according to the state of the virtual machine of the user, the controller 130 may support to deallocate the virtual machine resource allocated to the terminal device 140 of the user.

Specifically, after a predetermined virtual machine resource is allocated to the terminal device 140 of the user, the controller 130 may confirm or support to confirm a virtual machine usage state on the terminal device 140 of the user based on at least some information of a size of a packet transmitted and received between the terminal device 140 of the user and the virtual machine allocated thereto, loading data, and a transmission time interval.

In this case, the virtual machine usage state may be a state in which the user is using the virtual machine or a state in which the user does not use the virtual machine. Here, the state in which the user does not use the virtual machine may include a state in which the user does not meaningfully use the virtual machine.

Specifically, the virtual machine usage state of the user may include subliminal use and perceivable use. The subliminal use may refer to a case in which the use of a virtual machine of the user exists but there is no meaningful virtual machine use. For example, when the use of the virtual machine of the user is not meaningful, such as when the user moves only a mouse cursor without a separate click or touch on the virtual machine, when the same input is repeatedly received, or when a system or application of the virtual machine is operated in the background in which essential packets are transmitted and received, etc., the controller 130 may confirm or support to confirm the user not using the virtual machine.

Based on determination that the user of the terminal device does not use the virtual machine as a result of the confirmation, the controller 130 may support to delete a process corresponding to the allocated predetermined virtual machine resource.

Meanwhile, the user may not accurately know the size of a virtual machine resource required to perform a specific task. In this case, the virtual machine resource may be allocated to the terminal device 140 of the user according to the task performed by the user. That is, based on the information on the task performed by the user, the controller 130 may allocate the virtual machine resource to the terminal device 140 of the user.

That is, the controller 130 may confirm or support to confirm information on a task performed by the user on the terminal device 140 of the user and support to increase or decrease the size of a virtual machine resource allocated to the terminal device of the user based on the information on the task.

Specifically, the controller 130 may receive information on the task performed by the user from the terminal device 140 of the user. Also, based on the received information on the task, the controller 130 may support to increase or decrease the size of the virtual machine resource allocated to the terminal device 140 of the user by the size of the virtual machine resource required to perform the task.

Alternatively, the account information of the user may include information on the task performed by the user. At this time, based on the information on the task included in the account information of the user, the controller 130 may support to increase or decrease the size of the virtual machine resource allocated to the terminal device 200 of the user by the size of the virtual machine resource required to perform the task.

The size of the virtual machine resource required to perform the task may be different according to the type of the task, and as the limited virtual machine resource is allocated to the terminal device 140 of the user according to the information on the task through the method described above, the limited virtual machine resource may be efficiently used.

Also, the controller 130 may support to increase or decrease the size of the virtual machine resource allowed to the user based on size information on a virtual machine resource used by a plurality of users at the time of performing a second task similar to the task in the past.

Specifically, based on the information on the size of the virtual machine resource consumed at the time of performing the same or similar task as the task performed by the user, the controller 130 may support to increase or decrease the size of the virtual machine resource allocated to the user to the size of the previously consumed virtual machine resource.

Meanwhile, based on the virtual machine resource allowed to the organization to which the user belongs, the controller 130 may allocate the virtual machine resource to the terminal device 140 of the user.

Specifically, based on at least some of the plurality of virtual machine resources exceeding a virtual machine resource allowed to an organization, to which the user belongs, and based on a request for allocating the at least some virtual machine resources to the terminal device being received, the controller 130 may support to deny allocation of the at least some virtual machine resources or allocate only the virtual machine resources allowed to the organization, to which the user belongs, to the terminal device.

Alternatively, based on at least some of the plurality of virtual machine resources being within a range of a virtual machine resource allowed to an organization, to which the user belongs, and based on a request for allocating the at least some virtual machine resources to the terminal device being received, the controller 130 may support to allocate the at least some virtual machine resources to the terminal device and, as a result, to reduce virtual machine resources capable of being allocated to a terminal device of another user who belongs to the organization.

Specifically, the account information of the user may include information on the organization to which the user belongs, and the information on the organization to which the user belongs may include information on virtual machine resources for which the user has a usage authority in the organization.

The controller 130 may receive a virtual machine resource allocation request from the terminal device 140 of the user. In addition, the controller 130 may confirm or support to confirm whether the virtual machine resource requested to be allocated exceeds the virtual machine resource that the organization to which the user belongs has a usage authority.

At this time, based on a request for allocating virtual machine resources exceeding the virtual machine resource for which the organization, to which the user belongs, has a usage authority, the controller 130 may deny the virtual machine resources requested by the terminal device 140 of the user or may support to allocate the virtual machine resource to the terminal device of the user by the amount of virtual machine resources granted to the organization.

Alternatively, the controller 130 may receive, from the terminal device 140 of the user, a request for allocating virtual machine resources within a virtual machine resource for which the organization, to which the user belongs, has a usage authority.

In addition, based on a request for allocating virtual machine resources not exceeding the virtual machine resource for which the organization, to which the user belongs, has a usage authority, the controller 130 may support to allocate the virtual machine resources requested by the terminal device 140 of the user to the terminal device 140 of the user.

Figure 3:
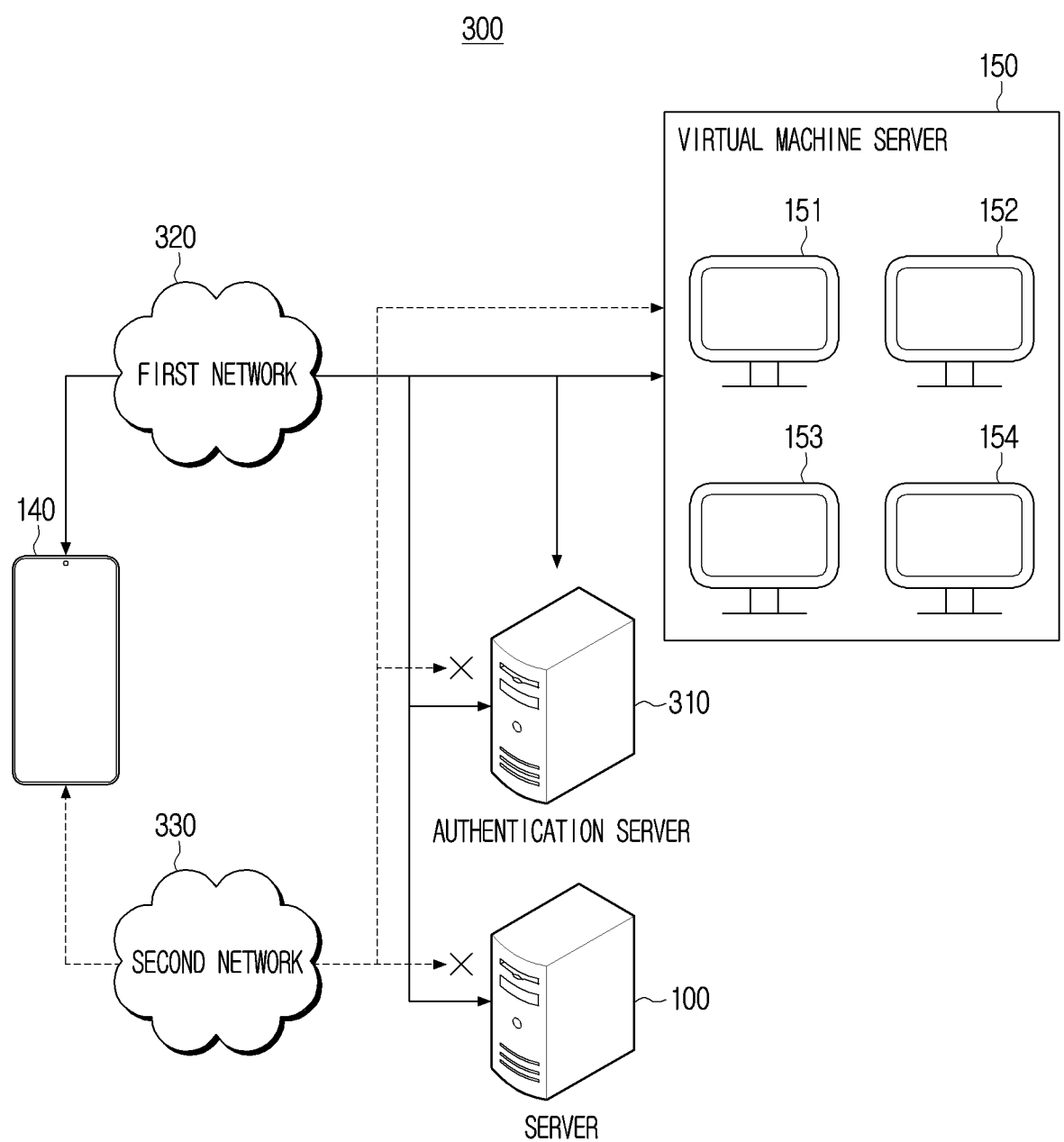
FIG. 3 is a view illustrating a cloud computing environment according to another embodiment of the disclosure.

FIG. 3 is a diagram illustrating a cloud computing environment 300 according to another embodiment of the disclosure.

The cloud computing environment 300 may include a server 100, a terminal device 140 of a user, a virtual machine server 150, and an authorization token management server 310. However, this is only an example, and the cloud computing environment 300 may further include a separate external server or a separate external device. In this case, the terminal device 140 of the user may be a tablet PC, but this is only an example and the terminal device 140 of the user may be implemented in various forms such as a smartphone, a mobile phone, a PC, a server, a smart TV, a personal digital assistant (PDA), a laptop, a media player, an e-book terminal, a digital broadcasting terminal, a navigation system, a kiosk, an MP3 player, a digital camera, a wearable device, a home appliance, and other mobile or non-mobile computing devices.

In the cloud computing environment 300, the virtual machine server 150 may process data and provide a result to the terminal device 140 of the user through a network. In this case, the cloud computing environment 300 may be implemented in the form of a public cloud, but this is only an example, and the cloud computing environment 300 may be implemented in various forms such as a private cloud, a community cloud, a hybrid cloud, and the like.

In this case, in the cloud computing environment 300, the virtual machine server 150 may provide various cloud services to the terminal device 140 of the user through a network. Here, the cloud service may be any one of infrastructure as a service (IaaS) that may provide a virtualized infrastructure environment to the terminal device 140 of the user, software as a service (SaaS) that provides application software through a network, or a platform as a service (PaaS) that provides hardware and software necessary for program design/development/distribution, etc., but is not limited thereto.

In this case, the terminal device 140 of the user may be one of a plurality of tenants provided with a virtual machine service by the virtual machine server 150, and the cloud server 150 may include at least one host that provides a computing resource to the terminal device 140 of the user.

In addition, each host may execute one or more virtual machines and provide the virtual machines to the terminal device 140 of the user. The virtual machine may emulate a fully operable computing system including at least one operating system and at least one application. That is, the virtual machine may refer to a computing environment implemented in software. When hardware is virtualized in a virtual machine-based cloud computing environment, a virtual machine may be generated on the virtual machine server 150, and the virtual machine may drive an independent operating system environment. An internal structure of the virtual machine is similar to a computing environment of a physical server, and like a real server, the virtual machine utilizes hardware resources such as CPU, memory, and storage, and may run an operating system therein and may run application programs.

In addition, the terminal device 140 of the user may communicate with the virtual machine server 150, and may perform various operations such as installing a desired application program on the generated virtual machine or driving an installed application program. When the terminal device 140 of the user interacts with the virtual machine, a user input obtained on the terminal device 140 of the user may be input in the virtual machine.

Meanwhile, a plurality of virtual machines 151, 152, 153, and 154 may be generated in the virtual machine server 150, and each virtual machine may have a different driving environment and may perform various applications, and each virtual machine may be allocated to a plurality of terminal devices.

In addition, the virtual machine server 150 may allocate different virtual machine resources to each terminal device and may efficiently utilize limited resources. That is, the virtual machine server 150 may allocate a plurality of virtual machine resources to be allocated to the plurality of terminal devices as much as needed to each terminal device.

In this case, in the cloud computing environment 300, the terminal device 140 of the user may communicate through the first network 320 or the second network 330. In this case, the first network 320 may be a network that meets a predetermined security requirement. In this case, the predetermined security requirement may be a network using a virtual private network (VPN), and here, the VPN may be variously configured according to a security protocol. For example, the VPN may be implemented as a secure sockets layer virtual private network (SSL VPN) or an Internet protocol security virtual private network (IPSec VPN), but is not limited thereto. In addition, the second network 330 may be a network that does not meet the predetermined security requirement.

First, the server 100 may confirm or support to confirm whether the terminal device 140 of the user requests a virtual machine resource through the first network 320 that meets the predetermined security requirement.

In addition, the authorization token management server 310 performs a credential process for the terminal device 140 of the user to access the virtual machine server 150 and use the virtual machine, confirm a usage authority for the virtual machine of the user, issue an authorization token, and provide the authorization token to the terminal device 140 of the user.

In this case, the authorization token management server 310 may conditionally allow or block the access of the terminal device 140 of the user.

Specifically, depending on whether the terminal device 140 of the user accesses the first network 320 that meets a predetermined security requirement, the authorization token management server 310 may issue an authorization token and provide the authorization token to the terminal device 140 of the user. In this case, based on a confirmation that the terminal device 140 of the user accessing through the first network 320 (i.e., a security network) that meets a predetermined security requirement and based on the allocation of a virtual machine and a usage authority for the terminal device 140 of the user, the authorization token management server 310 may issue an authorization token for the terminal device 140 of the user to access the virtual machine server 150 and provide the authorization token to the terminal device 140 of the user.

Meanwhile, based on a determination that the terminal device 140 of the user accesses through the second network 330 that does not meet the predetermined security requirement, the authorization token management server 310 may not issue an authorization token.

In addition, the server 100 may confirm whether a security network environment is maintained while the terminal device 140 of the user communicates with the allocated virtual machine. According to an embodiment, the terminal device 140 of the user may communicate with the virtual machine server 150 through the server 100, and in this case, the server 100 may check a network path of packets transmitted and received between the terminal device 140 of the user and the virtual machine server 150 and confirm whether a security network environment is maintained.

Alternatively, the server 100 may receive, from the virtual machine server 150, information on packets transmitted and received between the terminal device 140 of the user and the virtual machine, but is not limited thereto, and the server 100 may receive the information on the packets from the terminal device 140 of the user or a separate external device.

Also, depending on whether a security network environment is maintained while the terminal device 140 of the user and the virtual machine perform communication, the server 100 may control a communication connection session between the terminal device 140 of the user and the virtual machine server 150. Specifically, when it is determined that the terminal device 140 of the user accesses through the second network 330, the server 100 may block the communication connection session between the terminal device 140 of the user and the virtual machine or may control the terminal device 140 of the user to issue a security warning on the terminal device 140 of the user.

A specific method in which the server 100 supports security access to a virtual machine will be described in detail with reference to the drawings below.

The server 100 may include a storage 110, a communicator 120, and a controller 130.

The storage 110 may store at least one instruction related to the server 100. The storage 110 may store an operating system (O/S) for driving the server 100. Also, the storage 110 may store various software programs or applications for the server 100 to operate according to various embodiments of the disclosure. In addition, the storage 110 may include a semiconductor memory such as a flash memory or a magnetic storage medium such as a hard disk.

Specifically, the storage 110 may store various software modules for operating the server 100 according to various embodiments of the disclosure, and the controller 130 may control the operation of the server 100 by executing various software modules stored in the storage 110. That is, the storage 110 may be accessed by the controller 130, and reading/writing/modification/deletion/updating of data may be performed by the controller 130.

Meanwhile, in the disclosure, the term of storage 110 may refer to a memory (not shown), a ROM (not shown) in the controller 130, a RAM (not shown), or a memory card (not shown) mounted in the server 100 (e.g., a micro SD card, a memory stick).

The communicator 120 includes circuitry and is configured to communicate with an external device and an external server based on a wired or wireless communication method. Specifically, the communicator 120 may perform communication with the terminal device 140 of the user and the virtual machine server 150. In addition, the communicator 120 may include an Ethernet module, a Wi-Fi module (not shown), and the like. Here, each communication module may be implemented in the form of at least one hardware chip. In addition to the aforementioned communication methods, the wireless communication module may include at least one communication chip performing communication according to various wireless communication standards such as Zigbee, universal serial bus (USB), mobile industry processor interface camera serial interface (MIPI), 3rd generation (3G), 3rd generation partnership project (3GPP), long term evolution (LTE), LTE advanced (LTE-A), 4th generation (4G), 5th generation (5G), etc. However, this is only an example, and the communicator 120 may use at least one communication module among various communication modules.

In addition, the controller 130 may control overall operations and functions of the server 100. Specifically, the controller 130 may be connected to the configuration of the server 100 including the storage 110, and may generally control the operation of the server 100 by executing at least one instruction stored in the storage 110 described above.

The controller 130 may be implemented in various manners. For example, the controller 130 may be implemented as at least one of an application specific integrated circuit (ASIC), an embedded processor, a microprocessor, a hardware control logic, a hardware finite state machine (FSM), and a digital signal processor (DSP). Meanwhile, in the disclosure, the term of controller 130 may be used to include a central processing unit (CPU), a graphic processing unit (GPU), a main processing unit (MPU), and the like.

Hereinafter, a method for the server 100 to support security access to a virtual machine according to another embodiment of the disclosure will be described in detail with reference to the accompanying drawings.

The controller 130 may confirm or support to confirm whether the terminal device 140 of the user requests a virtual machine resource through the first network 320, i.e., a security network, that meets a predetermined security requirement.

Specifically, the controller 130 first confirms or supports to confirm setting of the first network of the terminal device 140 of the user. For example, the controller 130 may determine whether the terminal device 140 of the user requests generation of a virtual machine, activation of a virtual machine, or execution of a virtual machine process through a security network such as VPN. Based on network security not being satisfied, subsequent connection attempts thereafter may be rejected and a notification message may be displayed on the terminal device 140 of the user.

Alternatively, the terminal device 140 of the user may request a virtual machine resource from the virtual machine server 150. For example, the terminal device 140 of the user may request a virtual machine resource having 1 TB of storage, 8 GB of memory, and 4 processing cores.

Next, the controller 130 may confirm whether the terminal device 140 of the user requests a virtual machine resource through the first network 320 or may support a separate server (e.g., the virtual machine server 150, the authorization token management server 930, or other servers) on the cloud computing environment 900 to confirm the request. For example, an account management device (not shown) of the virtual machine server 150 may confirm whether the terminal device 140 of the user requests a virtual machine resource through a security network such as VPN. Based on network security not being satisfied, the virtual machine resource request may be rejected. Also, an authorization token, which will be described later, may not be issued.

Accordingly, the virtual machine server 150 may generate or execute a virtual machine process by allocating computing resources to the virtual machine. In addition, the virtual machine server 150 may allocate a virtual machine to which computing resources are allocated to the terminal device 140 of the user.

In this case, whether the terminal device 140 of the user requests a virtual machine resource through the first network 320 may be confirmed by checking a result of converting an address of the second network (i.e., a non-security network) not meeting the predetermined security requirement of the terminal device 140 of the user into a predefined first network address (security network).

In this case, based on an access through the first network 320 being confirmed and based on an allocation of a virtual machine to the terminal device 140 of the user and a usage authority of the virtual machine being confirmed, an authorization token may be issued. Here, the authorization token may be issued based on the user's qualification being confirmed by an account management device of the authorization token management server 930.

In this case, based on the user's personal information of the terminal device 140 of the user, whether the virtual machine is allocated to the user and the usage authority for the virtual machine is confirmed and an authorization token may be issued.

The terminal device 140 of the user may communicate with the allocated virtual machine using the authorization token. That is, the terminal device 140 of the user may be provided with a virtual machine from the virtual machine server 150 by verifying the credentials with the authorization token. In this state, the controller 130 may confirm a path of a packet transmitted/received between the terminal device 140 of the user and the allocated virtual machine, or support to confirm by providing the packet to another device.

Based on a determination that the transmission/reception packet is transmitted through the second network 330 that does not meet the predetermined security requirement as a result of checking the path, the controller 130 may block the session connection between the terminal device 140 of the user and the virtual machine or control the terminal device 140 of the user to issue a security warning.

As mentioned above, based an integrated access to the first network 320 of the terminal device 140 of the user being not confirmed, the controller 130 may reject the virtual machine resource request from the terminal device 140 of the user and control the terminal device 140 of the user to issue a security warning.

Figure 4:
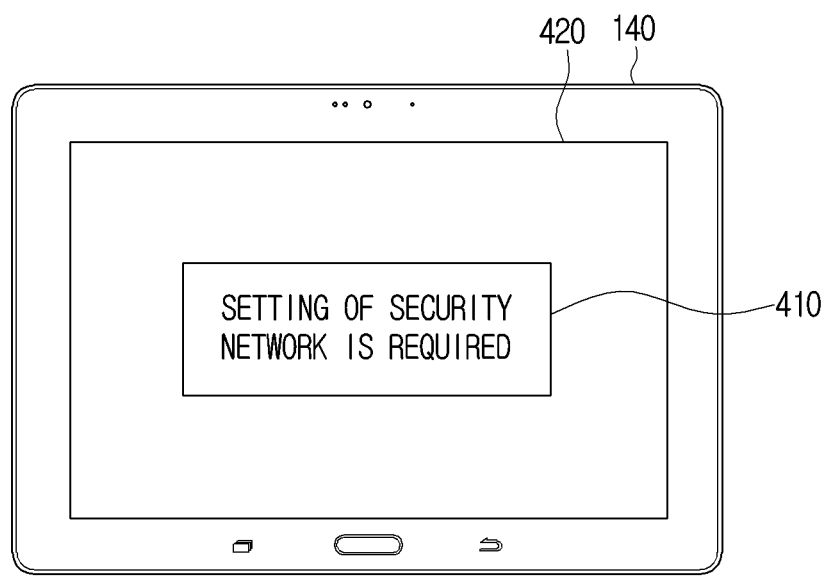
FIG. 4 is a flowchart illustrating a security warning method of a server according to another embodiment of the disclosure.

Accordingly, the terminal device 140 of the user may provide the user with information that the first network connection is required. In this case, the terminal device 140 of the user may also provide information on a method for connecting to a security network. For example, as shown in FIG. 4, the terminal device 140 of the user may control the display 420 of the terminal device 140 of the user to display information 410 indicating that a security network setting such as SSL VPN is required. Meanwhile, based on a process execution request of a virtual machine being received from the terminal device 140 of the user before the authorization token being issued, the controller 130 may generate a process of the virtual machine allocated to the terminal device 140 of the user and load the process on the memory or support the generation and the loading.

In addition, based on an access through the security network of the terminal device 140 of the user being confirmed and a virtual machine resource allocation request being received from the terminal device 140 of the user, the controller 130 may allocate or support to allocate the virtual machine resource to the terminal device 140 of the user. That is, based on the security network access of the terminal device 140 of the user being confirmed, the virtual machine server 150 may execute a virtual machine process and allocate a virtual machine resource to the terminal device 140 of the user.

In addition, based on a request for executing the process of the virtual machine from the terminal device 140 of the user through the second network 330, the controller 130 may reject the request for executing the process of the virtual machine and control the terminal device 140 of the user to issue a security warning on the terminal device 140 of the user.

Meanwhile, although the setting of the first network 320 is confirmed, based on the virtual machine resource request being performed without a process execution request of the allocated virtual machine from the terminal device 140 of the user, the controller 130 may confirm whether a process of the virtual machine allocated to the terminal device 140 of the user is generated and loaded on the memory, and may support to reject or accept the virtual machine resource request according to a result of the confirmation.

Figure 5:
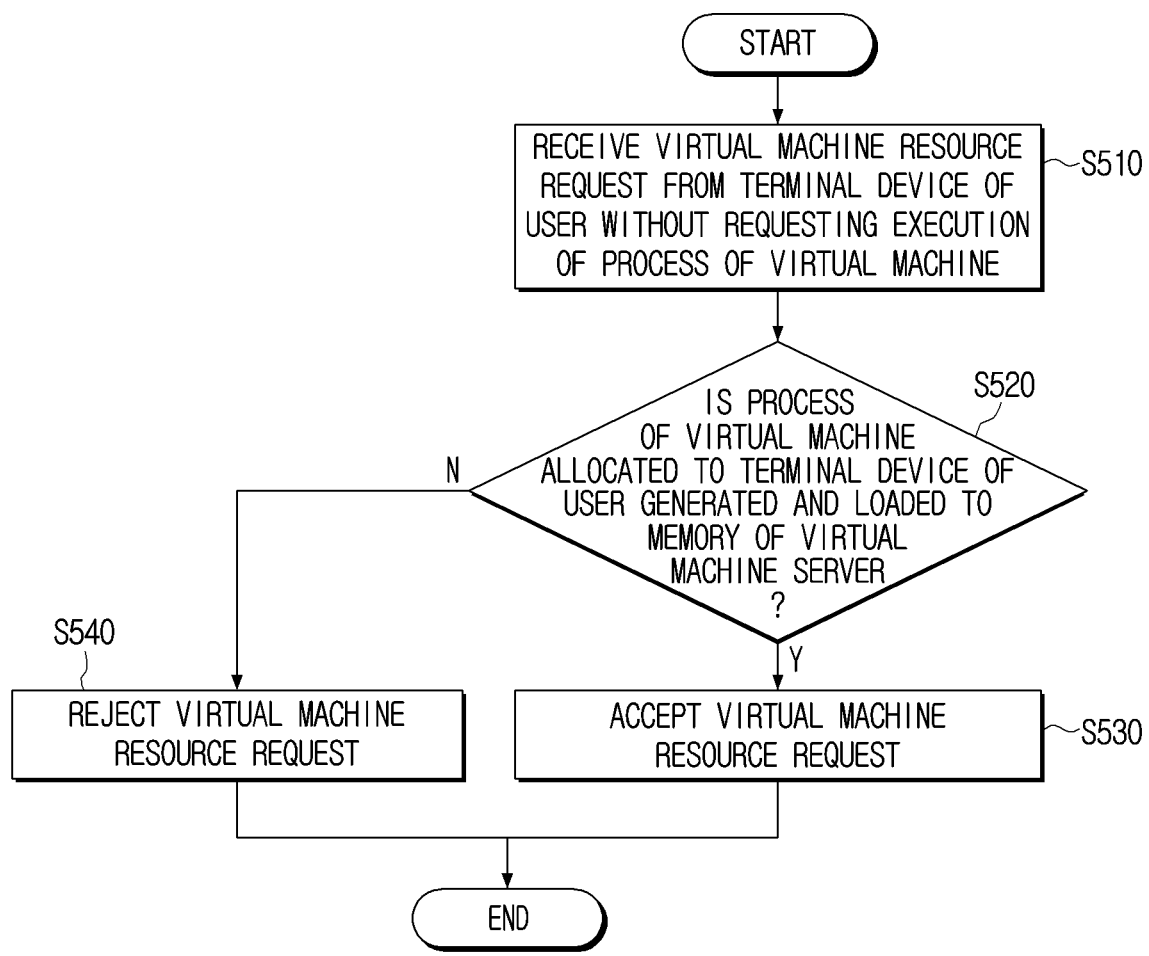
FIG. 5 is a flowchart illustrating a method for a server to process a virtual machine resource request according to another embodiment of the disclosure.

Specifically, referring to FIG. 5, the controller 130 may receive a virtual machine resource request from the terminal device 140 of the user without a request for executing the virtual machine process (S510). Then, the controller 130 may confirm whether the process of the virtual machine allocated to the terminal device 140 of the user is generated and loaded in the memory of the virtual machine server 150 (S520).

Based on a virtual machine resource request being received, while the virtual machine process is loaded in the memory of the virtual machine server 150 (S520—Y), the controller 130 may support to accept the virtual machine resource request (S530).

Alternatively, based on a virtual machine resource request being received, while the virtual machine process is not loaded in the memory of the virtual machine server 150 (S520—N), the controller 130 may support to reject the virtual machine resource request (S540).

Meanwhile, based on an access of the terminal device 140 of the user through the security network and based on user's personal information of the terminal device 140 of the user, whether to allocate a virtual machine to the user and a usage authority for the virtual machine may be confirmed and an issued authorization token may be obtained.

Specifically, the authorization token management server 930 may obtain the user's personal information from the terminal device 140 of the user. In this case, the user's personal information may be identification information (e.g., ID and password) for accessing the virtual machine of the user. In addition, based on the obtained user's personal information, the authorization token management server 930 may confirm a usage authority of a virtual machine of the terminal device 140 of the user.

That is, based on the obtained user identification information matching the previously stored user identification information, the authorization token management server 930 may transmit an authorization token to the terminal device 140 of the user. At this time, the authorization token management server 150 may transmit the authorization token to the terminal device 140 of the user only when the access of the terminal device 140 of the user through the security network is confirmed or only when the virtual machine allocation to the user of the terminal device 140 is confirmed.

Meanwhile, even if access through the security network or whether the virtual machine allocation and usage authority of the terminal device 140 of the user are confirmed, the authorization token may not be issued based on the virtual machine allocated to the terminal device 140 of the user being terminated or being in an inactive state.

Meanwhile, when access through the security network is confirmed and an authorization token is issued, the terminal device 140 of the user may communicate with the virtual machine using the issued authorization token, and the virtual machine allocated to terminal device 140 of the user may be used. At this time, in order to confirm whether access of the terminal device 140 of the user through the security network is maintained while the terminal device 140 of the user communicates with the virtual machine, the controller 130 may confirm or support to confirm a path of packets transmitted and received by the terminal device 140 of the user to and from the virtual machine to use the virtual machine.

Specifically, the terminal device 140 of the user and the virtual machine server 150 may communicate through the server 100, and in this case, the server 100 may confirm the packets transmitted and received between the terminal device 140 of the user and the virtual machine server 150 (or virtual machine). Alternatively, the controller 130 may receive at least some of the packets transmitted and received from the terminal device 140 of the user or the virtual machine server 150 to use the virtual machine. Accordingly, based on the obtained path of the packets, the controller 130 may confirm whether the access of the terminal device 140 of the user through the security network is maintained.

At this time, the controller 130 may determine whether the transmission/reception packets are transmitted through the first network 320 that meets the predetermined security requirement or the second network 330 that does not meet the predetermined security requirement by confirming the path of the packets. At this time, based on a determination that the packets are transmitted through the first network 320 (security network) as a result of confirmation of the path of the packets, the controller 130 may maintain the session connection between the terminal device 140 of the user and the virtual machine. Meanwhile, based on a determination that the packets are transmitted through the second network 330 (non-security network), the controller 130 may block the session connection between the terminal device 140 of the user and the virtual machine server 150 or control the terminal device 140 of the user to issue a security warning on the terminal device 140 of the user.

Meanwhile, in this case, based on the security warning issued on the terminal device 140 of the user and based on an input of user feedback information, the controller 130 may block or support to block the session connection between the terminal device 140 of the user and the virtual machine server 150.

The controller 130 may control the terminal device 140 of the user to issue a security warning on the terminal device 140 of the user. Specifically, the controller 130 may control the terminal device 140 of the user to display information indicating that the terminal device 140 of the user is transmitting and receiving packets through an insecurity network on a display (not shown) of the terminal device 140 of the user. For example, the controller 130 may control the terminal device 140 of the user to provide a UI for obtaining a user input for setting a security network of the terminal device 140 of the user.

Also, the controller 130 may identify whether the user's feedback is obtained from the terminal device 140 of the user within a predetermined time after the security warning is issued. In this case, the user's feedback may refer to setting of the security network of the terminal device 140 of the user to transmit the packets through the security network. For example, the user's feedback may be a user input obtained through a UI for obtaining a user input for setting a security network.

Based on the user's feedback obtained from the terminal device 140 of the user within a predetermined time being identified, the controller 130 may maintain the connection session between the terminal device 140 of the user and the virtual machine.

Also, based on the user's feedback obtained from the terminal device 140 of the user within a predetermined time not being identified, the controller 130 may block the connection session between the terminal device 140 of the user and the virtual machine.

Figure 6:
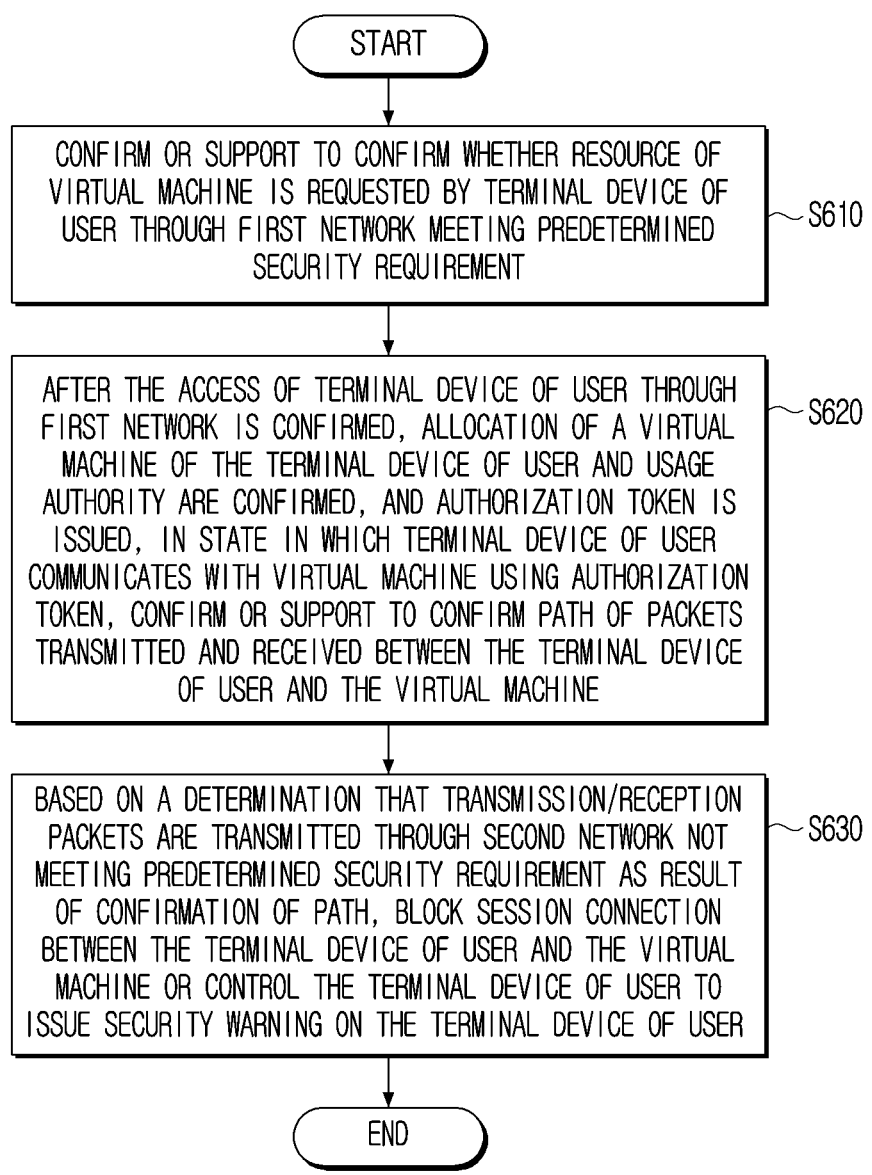
FIG. 6 is a flowchart illustrating a method of controlling a server according to another embodiment of the disclosure.

FIG. 6 is a view illustrating a method of controlling a server according to another embodiment of the disclosure.

The server 100 may confirm or support to confirm whether the terminal device of the user requests a virtual machine resource through a first network meeting a predetermined security requirement (S610). At this time, the server 100 may confirm whether the terminal device 140 of the user requests a virtual machine resource through the first network 320 by confirming a result of converting the non-security network address of the terminal device of the user into a predefined security network address.

Also, after the access through the first network 320 is confirmed and after the allocation of the virtual machine to the terminal device 140 of the user and the usage authority are confirmed and an authorization token is issued, in a state where the terminal device 140 of the user communicates with the allocated virtual machine using the authorization token, the server 100 may confirm or support to confirm a path of packets transmitted or received between the terminal device of the user and the allocated virtual machine (S620). In this case, based on the user's personal information of the terminal device 140 of the user, whether the virtual machine is allocated to the user and the usage authority for the virtual machine may be confirmed and an authorization token may be issued. Also, based on an access through the first network 320 not being confirmed, the server 100 may reject the virtual machine resource request and control the terminal device 140 of the user to issue a security warning on the terminal device 140 of the user.

Based on determination that the transmission and reception packets are transmitted through a second network 330 that does not meet the predetermined security requirement as a result of the confirmation of the path, the server 100 may block the session connection between the terminal device 140 of the user and the virtual machine or control the terminal device 140 of the user to issue a security warning on the terminal device 140 of the user.

Figure 7:
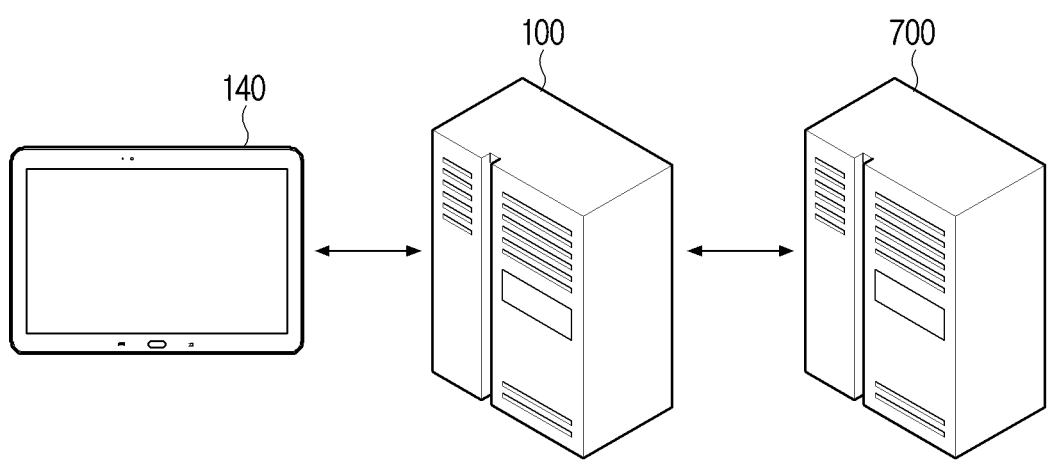
FIG. 7 is a view illustrating a system for providing a security environment, according to an embodiment of the disclosure.

FIG. 7 is a view illustrating a system for providing a security environment, according to another embodiment of the disclosure. As shown in FIG. 7, a system for providing a security environment may include a terminal device 140 of a user, a server 100, and a work server 700. In this case, the terminal device 140 of the user may be a tablet PC, but this is only an example and may be implemented as various terminal devices of the users such as a smartphone, a desktop PC, and a notebook PC. In addition, because the server 100 supports the terminal device 140 of the user to access the server 100 or the work server 700 related to the server 100 in a security environment, the server 100 may be referred to as a security server.

The terminal device 140 of the user may transmit a container generation request from the server 100 in order to conduct business in a security environment. That is, the terminal device 140 of the user may transmit a request for logically generating a security container that may access the server 100 or the work server 700 under a predetermined security condition required by the server and a non-security container for communicating with another server in a weak situation compared with the security condition. In this case, the terminal device 140 of the user may transmit unique identification information of the terminal device 140 of the user together with the container generation request. The unique identification information may include at least some of device code information given during manufacturing of the terminal device 140 of the user, a phone number of the terminal device 140 of the user, and mobile communication chip information.

The server 100 may verify unique identification information of the terminal device 140 of the user to authenticate the terminal device 140 of the user or provide information to another authentication device (not shown) to support authentication. That is, the server 100 may authenticate whether the terminal device 140 of the user is a terminal device that may be able to access the server 100 or the work server 700 by comparing the unique identification information of the terminal device 140 of the user with pre-registered identification information.

When the terminal device 140 of the user is authenticated as a terminal device of the user that may access the server 100 or the work server 700, the server 100 may transmit or support to transmit security environment information to the terminal device 140 of the user. The security environment information may include network information that allows the communication environment of the security container to meet predetermined security conditions (VPN, multi-factor authentication, vaccine information, security update information, emergency access information, etc. may be included), security solution information (update information, vaccine, DLP, DRM, etc. may be included), e-mail security information (text inspection, VPN, encrypted communication, multi-factor authentication, etc. may be included), user authentication information (integrated authentication, access history and tracking, multi-factor authentication, etc. may be included), password security information (password rules, account passwords, browser security, etc. may be included), and the like. In addition, the security environment information may further include information on security conditions required by the financial authorities.

In addition, when the terminal device 140 of the user logically separates the security container and the non-security container, the server 100 may remotely install or support to install an application for which the usage authority of the terminal device 140 of the user is recognized in the security container. For example, the server 100 may directly access the security container of the terminal device 140 of the user to remotely install or support to install an application for which the usage authority is recognized. Alternatively, the server 100 may support to install the application by allowing the user to download the application for which usage authority is recognized through the security container of the terminal device 140 of the user.

After logically separated into a security container and a non-security container, the terminal device 140 of the user may transmit an access request for the server 100 or a resource (e.g., the work server 700) related to the server 100 through the security container, while operating in a business mode.

The server 100 may confirm a security condition of the terminal device 140 of the user that has transmitted the access request through the security container and unique identification information of the terminal device 140 of the user. The server 100 may determine whether the security condition is satisfied and the unique identification information corresponds to pre-registered information. Based on a determination that the security condition is satisfied and the unique identification information corresponds to the pre-registered information, the server 100 may allow or support to allow access to the server 100 or a resource related to the server according to the access request, and, based on a determination that the security condition is not satisfied or the unique identification information does not correspond to the pre-registered information, the server 100 may reject or support to reject the access request of the terminal device 140 of the user.

After the terminal device 140 of the user is connected to the server 100 or the work server 700, the server 100 or the work server 700 may support the terminal device 140 of the user to perform business in a security environment. In an embodiment, the server 100 may support installation of an application that is not installed in the security container of the terminal device 140 of the user. In another embodiment, the server 100 may receive a mail from an external mail server and provide the received mail to the terminal device 140 of the user. In another embodiment, the server 100 may support access to a virtual machine resource through a network (e.g., a virtual private network (VNP)) encrypted by the terminal device 140 of the user using a security container. In another embodiment, the server 100 may support the terminal device 140 of the user to access a document sharing server for document collaboration in a business system through the security container. In another embodiment, the server 100 may determine whether the terminal device 140 of the user performs business at a workplace by confirming location information of the terminal device 140 of the user when the terminal device 140 of the user accesses through the security container. In another example, the server 100 may support reading of external data obtained through the non-security container of the terminal device 140 of the user through the security container.

Meanwhile, in the embodiment described above, it is described that the server 100 and the work server 700 are each implemented as one, but this is only an example and the server 100 and the work server 700 may be implemented as a plurality of servers, respectively. In addition, the server 100 and the work server 700 may not be physically separated but may be implemented as one server. In addition, of course, a virtual machine server for the terminal device 140 of the user to access a virtual machine may be further included in addition to the server 100 and the work server 700.

Figure 13:
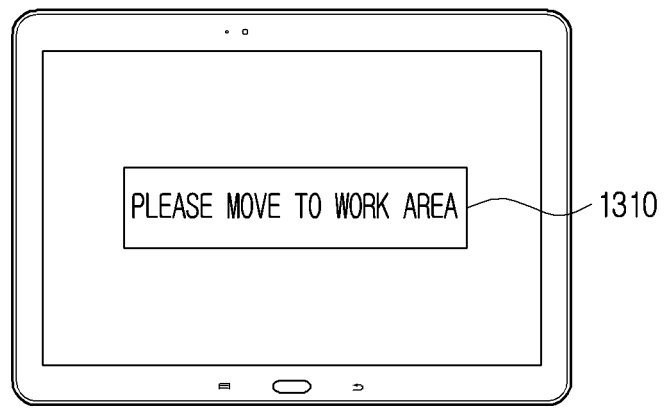
FIG. 13 is a view illustrating a guide message provided when a terminal device of a user deviates from an allowed location according to an embodiment of the disclosure.

FIG. 13 The server 100 may include a communicator 110, a storage 120, and a controller 130. However, this is only an example, and the server 100 may further include other components such as a display in addition to the communicator 110, the storage 120, and the controller 130.

The communicator 110 may include a circuit and may communicate with an external device. Specifically, the controller 130 may receive various data or information from an external device connected through the communicator 110 and may transmit various data or information to the external device.

The communicator 110 may include at least one of a WiFi module and a wireless communication module. Specifically, the WiFi module may perform communication in a WiFi manner. In the case of using the WiFi module, various types of connection information such as an SSID may be first transmitted and received, and then various types of information may be transmitted and received after communication connection using the WiFi module. In addition, the wireless communication module may perform communication according to various communication standards such as IEEE, Zigbee, 3rd Generation (3G), 3rd Generation Partnership Project (3GPP), Long Term Evolution (LTE), 5th Generation (5G), and the like.

Meanwhile, the communicator 100 may communicate with the terminal device 140 of the user or the work server 700 using an encrypted network (e.g., VPN).

The storage 120 may store various instructions for controlling an overall operation of the server 100. In particular, the storage 120 may store unique identification information for the terminal device 140 of the user capable of accessing the server 100 or a resource related thereto. In addition, the storage 120 may store security environment information including a security condition to which the terminal device 140 of the user may access in the security environment.

The controller 130 may control the operation of the server 100 according to various instructions stored in the storage 120. In particular, the controller 130 may support access of the terminal device 140 of the user in a security environment.

Hereinafter, various embodiments in which the server 100 supports access to the terminal device 140 of the user in a security environment will be described with reference to FIGS. 8 to 13.

Figure 8:
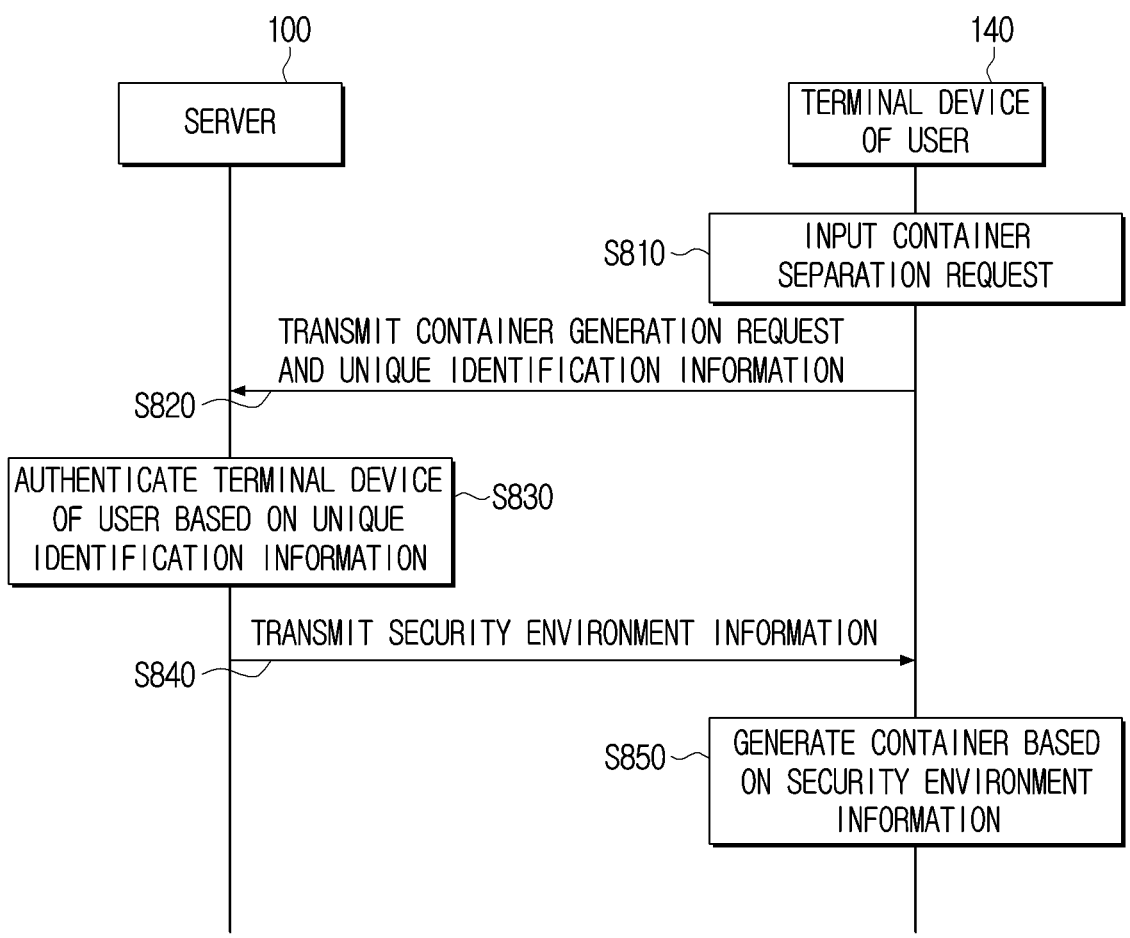
FIG. 8 is a view illustrating a software structure of a terminal device of a user according to an embodiment of the disclosure.

FIG. 8 is a sequence view illustrating a method for a server to generate a container of a terminal device of a user according to an embodiment of the disclosure.

First, the terminal device 140 of the user may receive a container generation request (S810). In this case, the container generation request may be received after first accessing the server 100 and then logging into the server 100. Alternatively, when logging into the server 100, the container generation request may be automatically input to the terminal device 140 of the user.

The terminal device 140 of the user may transmit the container generation request and unique identification information (S820).

Also, the server 100 may authenticate the terminal device 140 of the user based on the unique identification information (S830). Specifically, when a container generation request is received from the terminal device 140 of the user, the server 100 may verify the unique identification information received from the terminal device 140 of the user to authenticate or support to authenticate the terminal device 140 of the user. The storage 120 of the server 100 may pre-store the unique identification information on the terminal device 140 of the user corresponding to a user of a corresponding company. In this case, the unique identification information may include at least some of device code information given during manufacturing of the terminal device 140 of the user, a phone number of the terminal device 140 of the user, and mobile communication chip information (e.g., USIM chip information), not simply a MAC address or an IP address. That is, by storing not only communication information such as a phone number and a mobile communication chip of the terminal device 140 of the user but also device code information given at the time of manufacturing the terminal device 140 of the user, the terminal device 140 of the user corresponding to the user, as well as the user, may be authenticated. Accordingly, when the user uses an arbitrary terminal device 140 of a user, the company cannot check the security of the arbitrary terminal device 140 of the user, so security is highly likely to be weak, but, as the terminal device 140 of the user designated by the company is used, security may be further enhanced.

When the terminal device 140 of the user is authenticated, the server 100 may provide or support to provide predetermined security environment information required by the server 100 to the authenticated terminal device 140 of the user (S840). In this case, the security environment information may include network information (e.g., information on an encrypted network (SSL-VPN), etc.) that allows the communication environment of the security container to meet a predetermined security condition. In addition, the security environment information may further include information on security conditions required by the terminal device 140 of the user to be used by a financial company requested by a financial authority. For example, the terminal device 140 of the user may require the following security conditions.

1. Take measures to prevent unauthorized operation of the terminal by anyone other than the person in charge
2. To maintain a record that may verify whether a user is an authorized user for a terminal accessing the information processing system
3. To designate important terminals to which enhanced protection measures are applied, such as prohibition of exporting, Internet access, and groupware access
4. To control access to auxiliary storage medium and portable computer equipment from terminals to prevent information leakage and malicious code infection The terminal device 140 of the user may separate the container based on the security environment information (S850). Specifically, the terminal device 140 of the user may separate into (i) a security container for communicating with the server 100 under a predetermined security condition required by the server 100 based on the security environment information and (ii) a non-security container for communicating with other servers in vulnerable situations compared with the security condition. That is, the server 100 may support container separation of the terminal device 140 of the user so that the communication environment of the security container meets the predetermined security condition.

In addition, when the terminal device 140 of the user is authenticated, the server 100 may remotely install or support to install an application for which the usage authority of the terminal device 140 of the user is recognized in the security container of the terminal device 140 of the user. That is, the controller 130 may remotely install or support to install of an application for which a usage authority to be used for work is recognized.

Figure 9:
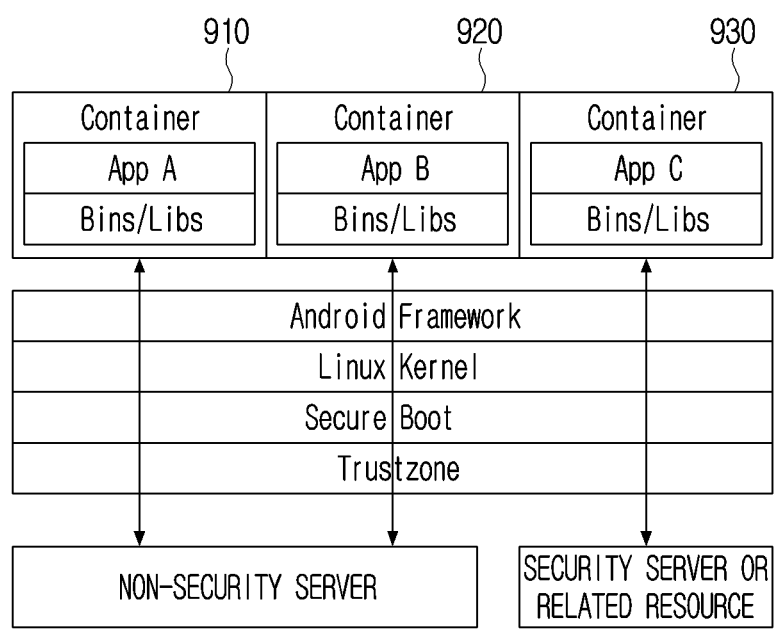
FIG. 9 is a sequence diagram illustrating a method for a server to generate a container of a terminal device of a user according to an embodiment of the disclosure.

The terminal device 140 of the user separated into a security container and a non-security container will be described in more detail with reference to FIG. 9.

A container is a packaging of an application and data for executing the application (e.g., code, library, environment variable, configuration file, etc.), and as shown in FIG. 8, containers may be separated into non-security containers 910 and 920 and security containers 930. The non-security containers 910 and 920 may be containers packaging images that may be executed via the general Internet (e.g., application A and Bins, Libs data, etc. thereof), which may be connected to other servers (e.g., non-secure servers) in a vulnerable situation compared with the security condition required for the security container, and the security container 930 may be a container packaging images (e.g., application C and Bins, Libs data, etc. thereof) that may be executed through an encrypted network and accessing the server 100 or related resources (e.g., a cloud server including virtual machine resources or a work server 700).

The non-security containers 910 and 920 and the security container 930 may be launched by executing an image (a package including data necessary to run an application) and may share a host kernel.

Also, the terminal device 140 of the user may provide a personal mode that may be used for personal use and a work mode that may be used for business. A screen of the terminal device 140 of the user may include a UI (e.g., an icon) for entering the personal mode and the work mode, and based on one of a first UI (icon) corresponding to the personal mode and a second UI (icon) corresponding to the work mode included in the screen being selected, the terminal device 140 of the user may operate in a mode corresponding to the selected UI. When the private mode is selected, the terminal device 140 of the user may access a general server (non-secure server) through the non-security containers 310 and 320. When the work mode is selected, the terminal device 140 of the user may access the security server 100 through the security container 930. In particular, when the work mode is selected, the terminal device 140 of the user may access the security server 100 using an encrypted network (e.g., SSL VPN, etc.).

Figure 10:
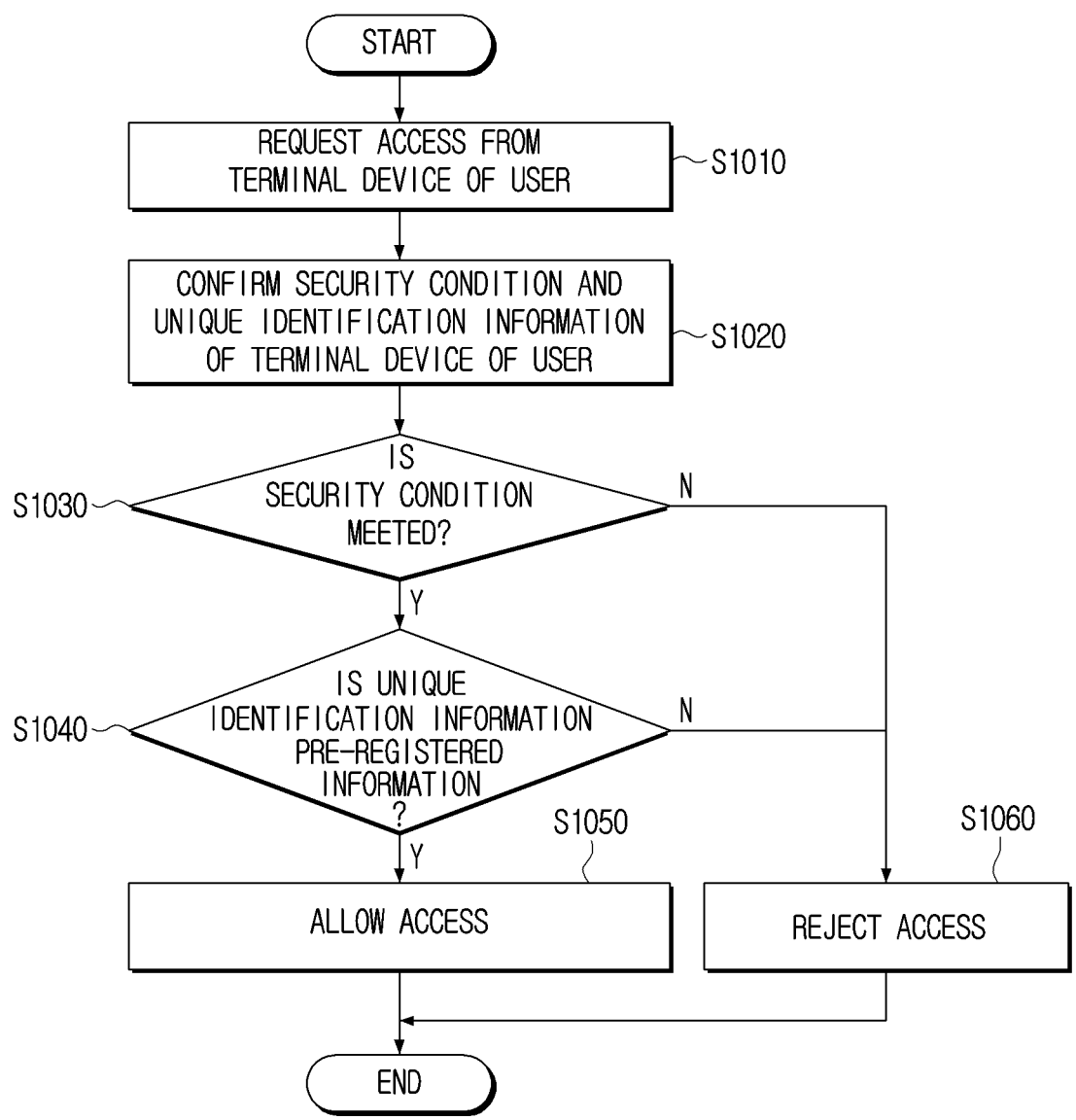
FIG. 10 is a flowchart illustrating a method in which a server supports access of a terminal device of a user in a security environment according to an embodiment of the disclosure.

A method in which the server 100 supports access of the terminal device 140 of the user in a security environment, while the terminal device 140 of the user operates in the work mode will be described with reference to FIG. 10. FIG. 10 is a flowchart illustrating a method in which the server 100 supports the access of the terminal device 140 of the user in a security environment according to an embodiment of the disclosure.

The server 100 may receive an access request from the terminal device 140 of the user (S1010). At this time, when a user command for operating in a work mode or executing an application (e.g., application C) of a security container is input to the terminal device 140 of the user, the server 100 may receive an access request from the terminal device 140 of the user.

The server 100 may confirm security conditions and unique identification information of the terminal device 140 of the user (S1020).

The server 100 may determine whether the security condition is satisfied (S1020). That is, the server 100 may determine whether the terminal device 140 of the user has accessed through an encrypted network or whether a security condition required by a financial authority is satisfied.

If the security condition is satisfied (S1030—Y), the server 100 may determine whether the unique identification information is pre-registered information (S1040). That is, the server 100 may determine whether pre-registered information corresponding to the unique identification information received from the terminal device 140 of the user exists.

If the unique identification information is pre-registered information (S1040—Y), the server 100 may allow access of the terminal device 140 of the user (S1050).

However, if the security condition is not satisfied (S1030—N), or if the unique identification information is not pre-registered information (S1040—N), the server 100 may reject the access of the terminal device 140 of the user (S1060). In this case, the server 100 may transmit a message including information on a reason for rejecting the access (e.g., unsatisfactory security condition, non-authentication of unique identification information, etc.) to the terminal device 140 of the user, and the terminal device 140 of the user may provide the message to the user.

As described above, by authenticating the terminal device 140 of the user by confirming the security conditions and unique identification information, the server 100 may support the terminal device 140 of the user to access the server 100 or related resources in a security environment.

Meanwhile, although it has been described in FIG. 10 that step S1030 is performed before step S1040, this is only an example, and step S1040 may be performed before step S1030, and step S1030 and step S1040 may be performed in parallel.

In addition, the server 100 may remotely install, delete, or manage applications required for work. That is, the server 100 may support the terminal device 140 of the user to access the server 100 in a security environment by separating an application required for work (i.e., applications registered in the server 100) as a security container. However, the user needs to run a specific application that is not registered in the server 100 in the work mode according to the nature of the work. Accordingly, the user may request installation from an administrator through an application store.

Specifically, an icon corresponding to an application store may be displayed on the screen of the terminal device 140 of the user. In this case, the icon corresponding to the application store may be an icon displayed in the work mode, but this is only an example and the icon corresponding to the application store may be an icon displayed in the personal mode. When the user selects the icon corresponding to the application store, the terminal device 140 of the user may provide a list including a plurality of applications. In particular, when an installation request is input by selecting a first application not installed in the security container among a plurality of applications, the terminal device 140 of the user may transmit an installation request for the first application not installed in the security container to the server 100.

The server 100 may determine whether to allow installation of the first application. In this case, when the first application is an application registered in the server, the server 100 may install or support to install the first application in the terminal device 140 of the user. When the first application is an application that is not registered in the server, the server 100 may transmit a message inquiring whether to allow the installation of the first application to a terminal device of the administrator. When a message permitting installation is received by the terminal device of the administrator, the server 100 may install or support to install the first application to the terminal device 140 of the user, but a message not permitting installation is received by the terminal device of the administrator, the server 100 may transmit a guide message indicating that the first application cannot be installed to the terminal device 140 of the user. In this case, the terminal device 140 of the user may display the guide message indicating that the first application cannot be installed.

Also, the server 100 may provide a mail received from an external mail server to the terminal device 140 of the user through the security container. Specifically, when an e-mail request is received through the security container of the terminal device 140 of the user, the server 100 may transmit or support for the external mail server to transmit text and attached documents of a mail stored in the user's mail box mapped to the terminal device 140 of the user to a security mail server accessible from the security container or the security container of the terminal device 140 of the user. Accordingly, the server 100 may support the user to check the mail in the application of the security container.

At this time, when a mail request is received through the security container of the terminal device 140 of the user, the external mail server may determine a spam mail among the received mails by itself and transmit a mail excluding the spam mail to the security mail server or the terminal device of the user (1310).

In addition, the security container may access the work server 700 of a corporate network through an encrypted network (e.g., a virtual private network (VPN), etc.). In this case, the terminal device 140 of the user may access a virtual machine through a security network (e.g., SSL VPN or IPSec VPN) in the security container. In this case, the server 100 may determine whether the security container of the terminal device of the user meets the security condition and may support the terminal device 140 of the user to access the allocated virtual machine (i.e., the cloud server).

Specifically, the server 100 may determine or support to determine whether a virtual machine resource request is received from the security container of the terminal device 140 of the user through the VPN. When the virtual machine allocation and usage authority for the user of the terminal device 140 is authenticated, the server 100 may allow or support to allow an access of the virtual machine through the security container. In this case, the usage authority may be authenticated with unique identification information, but this is only an example and the usage authority may be authenticated with other identification information (e.g., ID, password, etc.).

Figure 11A:
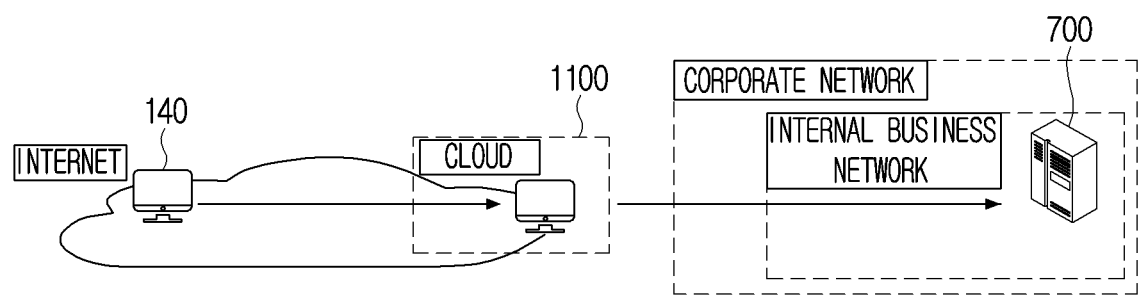
FIG. 11A is a view illustrating an embodiment of accessing a work server inside a corporate network via a virtual machine in a public cloud according to an embodiment of the disclosure.
Figure 11B:
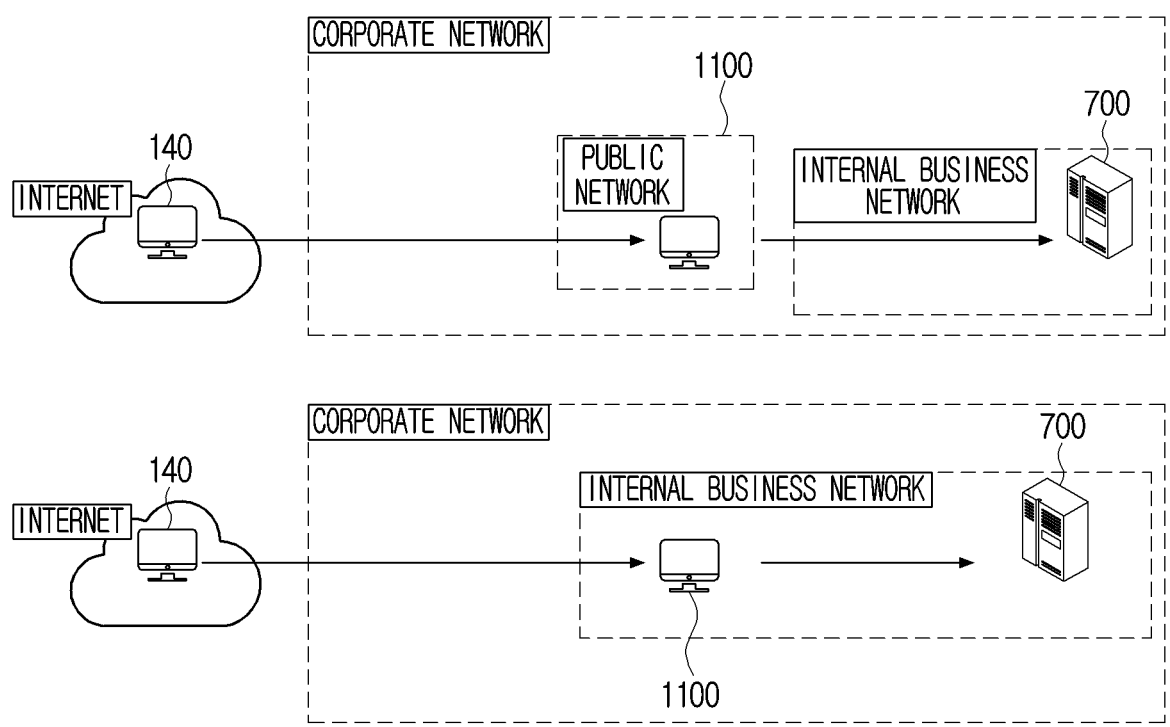
FIG. 11B is a view illustrating an embodiment of accessing a work server inside a corporate network via a virtual machine in a private cloud of the corporate network according to an embodiment of the disclosure.

Accordingly, the terminal device 140 of the user may communicate with the work server 700 of the corporate network after accessing the virtual machine. Meanwhile, as shown in FIG. 11A, the terminal device 140 of the user may communicate with the work server 700 of the corporate network after accessing the virtual machine 1100 of the public cloud, but this is only an example, and after accessing the virtual machine 1100 of the private cloud inside the corporate network, the terminal device 140 of the user may communicate with the work server 700 of the corporate network. Specifically, as shown in FIG. 11B, the terminal device 10 of the user may communicate with the work server 700 of the corporate network after accessing the virtual machine 1100 of the public network in the corporate network, and after accessing the virtual machine 1100 of the internal business network in the corporate network, the terminal device 140 of the user may communicate with the work server 700 of the corporate network.

However, after the virtual machine access is allowed, if a virtual machine communication request through a network that is less secure than a VPN is confirmed, the server 100 may block the session connection between the terminal device 140 of the user and the virtual machine server or control the terminal device 140 of the user to issue a security warning on the terminal device of the user. Specifically, after the access of the terminal device 140 of the user through the security network is confirmed, allocation of a virtual machine of the terminal device 140 of the user and a usage authority are confirmed, and an authorization token is issued, in a state in which the terminal device 140 of the user communicates with the virtual machine using the authorization token, the server 100 may confirm or support to confirm a path of packets transmitted and received between the terminal device 140 of the user and the virtual machine. Also, based on a determination that the transmission/reception packets are transmitted through the non-security network as a result of confirmation of the path of the packets, the server 100 may block the session connection between the terminal device 10 of the user and the virtual machine or control the terminal device 10 of the user to issue a security warning on the terminal device 10 of the user.

In addition, the server 100 may support the terminal device 140 of the user to access a document sharing server for document collaboration through the security container. In this case, the document sharing server may be a server in a work system necessary to systematically manage and utilize documents required for work in a company, rather than storing the documents in the terminal device 140 of the user.

Specifically, when the terminal device 140 of the user accesses the document sharing server for document collaboration through the security container, the server 100 may confirm an access authority of the terminal device 140 of the user. In particular, when the terminal device 10 of the user accesses the document sharing server through the virtual machine, the server 100 may confirm the access authority during user authentication in the virtual machine. When the terminal device 140 of the user directly accesses the document sharing server, the server 100 may confirm the access authority using the unique identification information of the terminal device 140 of the user.

When the terminal device 140 of the user has an access authority for the document sharing server, the server 100 may allow or support to allow the terminal device 140 of the user with the access authority to access the document sharing server.

In this case, the terminal device 140 of the user with the access authority may access a predetermined area (logical area) of the document sharing server. However, when a plurality of terminal devices of users access the same document file in the document sharing server, in an embodiment, only a first terminal device of a user has the authority to modify and the other terminal devices of users may have only an inquiry authority. In another embodiment, all terminal devices of users may have the authority to edit, but only a terminal device of a user that accesses the document first in a closed state may have the authority to edit. In this case, the access of the plurality of terminal devices of users may be recorded in the document sharing server or the server 100 to be read.

Also, the server 100 may receive the location information from the terminal device 10 of the user and determine whether the terminal device 10 of the user is in an allowed location (i.e., a work location).

Figure 12:
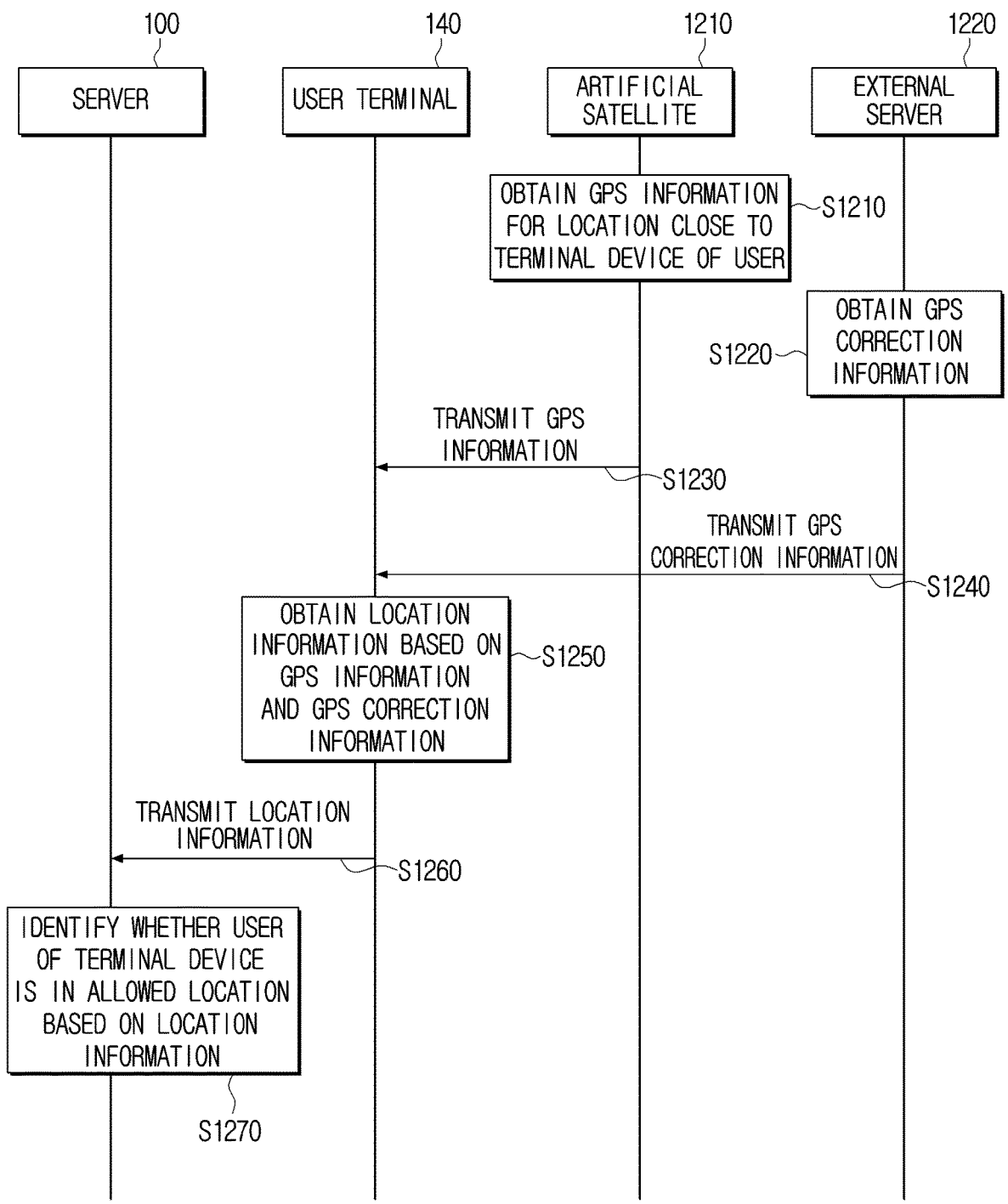
FIG. 12 is a sequence diagram illustrating a method for a server to identify a location of a terminal device of a user according to an embodiment of the disclosure.

This will be described in detail with reference to FIG. 12. FIG. 12 is a sequence diagram illustrating a method for a server to identify a location of a terminal device of a user, according to an embodiment of the disclosure.

An artificial satellite 1210 may obtain GPS information on a location close to the terminal device 10 of the user (S1210).

Also, the external server 1220 may obtain GPS correction information for the GPS information (S1220). In this case, the GPS correction information may include information such as satellite signal delay, satellite clock error, satellite orbit error, tropospheric error, ionospheric error, multipath, and the like. In particular, the GPS information may be observation space representation (OSR) information or state space representation (SSR) information. The OSR information is provided to the terminal device 140 of the user by adding all of the error factors of the GPS information, and the SSR information is provided to the terminal device 140 of the user by generating correction information for each error factor of the GPS information. In particular, the SSR information may be advantageous in terms of cost over the OSR information.

In addition, the artificial satellite 1210 may transmit GPS information to the terminal device 140 of the user (S1230), and the external server 1220 may transmit GPS correction information to the terminal device 140 of the user (S1240).

Then, the terminal device 140 of the user may obtain the actual location information of the terminal device 140 of the user based on the obtained GPS information and the GPS correction information (S1250).

The terminal device 140 of the user may transmit the obtained actual location information to the server 100 (S1260). Meanwhile, the terminal device 140 of the user may transmit the actual location information obtained while operating in the work mode to the server 100. That is, when the terminal device 140 of the user accesses the server 100 through the security container, the terminal device 140 of the user may transmit the actual location information.

Meanwhile, the actual location information may be calculated by the server 100. That is, after GPS information on a location close to the terminal device of the user is obtained from an artificial satellite by the terminal device of the user and GPS correction information for calculating an exact location of the terminal device of the user is obtained from an external server, the GPS information and GPS correction information may be transmitted to the server 100, and the server 100 may calculate the actual location information based on the information.

The server 100 may identify whether the user of the terminal device 140 is in an allowed location based on the actual location information (S1270).

When communication with the server 100 through the security container is detected while the user is outside the allowed location, the server 100 may block the access of the terminal device 140 of the user or may support to provide a guide message guiding the user to perform a task at a designated location through the terminal device 140 of the user through the terminal device 140 of the user. For example, if it is determined that the terminal device 140 of the user is out of a work area, as shown in FIG. 13, the terminal device 140 of the user may provide a guide message 1310 saying "Please move to work area".

In particular, if the user does not return to the designated work location even after the lapse of a predetermined time or even after a plurality of notices after first providing a guide message 1310 requesting that the user work in the designated work area at an initial time and keep security, the server 100 may forcibly block the communication connection. In addition, the server 100 may store the actual location information of the user in an attendance record without separately blocking access or providing a guide message.

In addition, the server 100 may support the terminal device 10 of the user to bring data obtained through the non-security container into the corporate network under the administrator's approval.

Specifically, when a request for importing external data obtained through the non-security container of the terminal device 10 of the user is received, the server 100 may store or support to store the external data in the cloud server, and may transmit summary information of the external data to a terminal device of an importing approval authority. In particular, a separate application or channel for a data importing request may exist in the work container of the terminal device 10 of the user, and in a situation where security requirements such as a security network are satisfied, the terminal device 10 of the user may receive an external data importing request through a separate application or channel.

When the importing request for external data is approved from the terminal device of the importing approval authority, the server 100 may bring in or support to bring in the external data requested to be brought into the corporate network, thereby supporting external data to be read through the security container of the terminal device 140 of the user. In this case, the server 100 may support to determine whether the external data requested to be imported contains malicious code or determine whether the external material requested to be imported in the corporate network contains malicious code.

Meanwhile, the method according to various embodiments of the disclosure may be stored in a storage medium. The device-readable storage medium may be provided in the form of a non-transitory storage medium. Here, 'non-transitory storage medium' is a tangible device and only means that it does not contain a signal (e.g., electromagnetic wave), and this term does not distinguish between a case where data is stored semi-permanently and a case where data is temporarily stored. For example, the 'non-transitory storage medium' may include a buffer in which data is temporarily stored.

According to an embodiment, the method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration.

According to various embodiments, operations performed by the part, the module, the program, or another component may be carried out sequentially, in parallel, repeatedly, or heuristically, or one or more of the operations may be executed in a different order or omitted, or one or more other operations may be added.

Hereinabove, the embodiments of the disclosure have been described but the disclosure is not limited to the specific embodiment and may be variously modified by a person skilled in the art to which the disclosure pertains without departing from the scope of the disclosure as claimed in the appended claims and such modifications should not be individually understood from technical concepts or prospects of the disclosure.

What is claimed is:

1. A method for supporting secure access to virtual machine on public cloud, the method comprising:
   (a) confirming or supporting to confirm whether a terminal device of a user requests a virtual machine resource through a first network meeting a predetermined security requirement;
   (b) after an allocation of the virtual machine to the terminal device of the user and a usage authority are confirmed and an authorization token is issued, in a state where the terminal device of the user communicates with the allocated virtual machine by verifying credential to virtual machine server on the public cloud using the authorization token, confirming or supporting to confirm a path of a packet transmitted or received between the terminal device of the user and the allocated virtual machine; and
   (c) based on determination that the packet is transmitted through a second network that does not meet the predetermined security requirement as a result of the confirmation of the path, blocking a session connection between the terminal device of the user and the virtual machine or controlling the terminal device of the user to issue a security warning on the terminal device of the user,
   wherein in the step (c),
   based on the security warning being issued and a feedback being not obtained for a predetermined time or longer from the terminal device of the user, blocking or supporting to block the session connection between the terminal device of the user and the virtual machine.

2. The method according to claim 1,
   wherein the step (b) comprises whether the terminal device of the user requests the virtual machine resource through the first network is confirmed by confirming a result that a network address is converted into a predefined first network address, and
   wherein the step (b) comprises, based on allocation of the virtual machine to a user of the terminal device and the usage authority being confirmed based on personal information on the user, the authorization token being issued.

3. The method according to claim 2,
wherein the first network is SSL VPN(Secure Sockets Layer Private Network) or IPSec VPN(Internet Protocol Security Virtual Private Network).

4. The method according to claim 1,
wherein the step (b) comprises,
based on access through the first network being not confirmed, controlling the terminal device of the user to reject the virtual machine resource request, and issue the security warning on the terminal device of the user.

5. The method according to claim 1,
wherein in the step (b),
although access through the first network, and the allocation and the usage authority of the virtual machine are confirmed, based on a process of the virtual machine allocated to the terminal device of the user being finished or in an inactive state, the authorization token is not issued.

6. The method according to claim 1, further comprising:
based on a process execution request of a virtual machine being received from the terminal device of the user before the authorization token being issued, generating a process of the virtual machine allocated to the terminal device of the user and loading the generated process or supporting the generation and the loading.

7. The method according to claim 6, further comprising:
based on the process execution request of the virtual machine being received from the terminal device of the user through the second network, rejecting the process execution request of the virtual machine, and controlling the terminal device of the user to issue the security warning on the terminal device of the user.

8. The method according to claim 1,
wherein the step (a) comprises:
(a1) confirming or supporting to confirm setting of the first network of the terminal device of the user; and
(a2) confirming or supporting to confirm whether the virtual machine resource request of the terminal device of the user is received through the first network.

9. The method according to claim 8, further comprising:
wherein, although the setting of the first network of the step (a1) is confirmed, based on the virtual machine resource request of the step (a2) being performed without a process execution request of the allocated virtual machine from the terminal device of the user, the server confirms whether a process of the virtual machine allocated to the terminal device of the user is generated and loaded, and supports to reject or accept the virtual machine resource request according to a result of the confirmation.

10. A server for supporting secure access to virtual machine on a public cloud comprising:
storage unit,
communication unit and
controller,
the controller is configured to:
confirm or support to confirm whether a terminal device of a user requests a virtual machine resource through a first network meeting a predetermined security requirement;
after an allocation of the virtual machine to the terminal device of the user and a usage authority are confirmed and an authorization token is issued, in a state where the terminal device of the user communicates with the allocated virtual machine by verifying credential to virtual machine server on the public cloud using the authorization token, confirm or support to confirm a path of a packet transmitted or received between the terminal device of the user and the allocated virtual machine; and
based on determination that the packet is transmitted through a second network that does not meet the predetermined security requirement as a result of the confirmation of the path, block a session connection between the terminal device of the user and the virtual machine or control the terminal device of the user to issue a security warning on the terminal device of the user,
wherein the controller is further configured to
based on the security warning being issued and a feedback being not obtained for a predetermined time or longer from the terminal device of the user, block or support to block the session connection between the terminal device of the user and the virtual machine.

11. The server of claim 10,
whether the terminal device of the user requests the virtual machine resource through the first network is confirmed by confirming a result that a network address is converted into a predefined first network address, and
based on allocation of the virtual machine to a user of the terminal device and the usage authority being confirmed based on personal information on the user, the authorization token being issued.

12. The server of claim 10,
wherein the first network is SSL VPN(Secure Sockets Layer Private Network) or IPSec VPN(Internet Protocol Security Virtual Private Network).

13. The server of claim 10,
the controller is further configured to;
based on access through the first network being not confirmed, controlling the terminal device of the user to reject the virtual machine resource request, and issue the security warning on the terminal device of the user.

14. The server of claim 10,
wherein although access through the first network, and the allocation and the usage authority of the virtual machine are confirmed, based on a process of the virtual machine allocated to the terminal device of the user being finished or in an inactive state, the authorization token is not issued.

15. The server of claim 10,
the controller is further configured to;
based on a process execution request of a virtual machine being received from the terminal device of the user before the authorization token being issued, generating a process of the virtual machine allocated to the terminal device of the user and loading the generated process on the storage unit or supporting the generation and the loading.

16. The server of claim 15,
the controller is further configured to;
based on the process execution request of the virtual machine being received from the terminal device of the user through the second network, rejecting the process execution request of the virtual machine, and controlling the terminal device of the user to issue the security warning on the terminal device of the user.

17. The server of claim 10,
the controller is further configured to;
confirm or support to confirm setting of the first network of the terminal device of the user, and
confirm or support to confirm whether the virtual machine resource request of the terminal device of the user is received through the first network.

18. The server of claim 17,
the controller is further configured to;
wherein, although the setting of the first network is confirmed, based on the virtual machine resource request being performed without a process execution request of the allocated virtual machine from the terminal device of the user,
confirms whether a process of the virtual machine allocated to the terminal device of the user is generated and loaded on the storage unit, and supports to reject or accept the virtual machine resource request according to a result of the confirmation.

* * * * *